US010493822B2

(12) United States Patent
Sagou et al.

(10) Patent No.: US 10,493,822 B2
(45) Date of Patent: Dec. 3, 2019

(54) RADIANT HEATER DEVICE

(71) Applicant: DENSO CORPORATION, Kariya, Aichi-pref. (JP)

(72) Inventors: Yasuhiro Sagou, Chiryu (JP); Takuya Kataoka, Okazaki (JP); Asami Okamoto, Kariya (JP); Manabu Maeda, Nagoya (JP); Koji Ota, Kariya (JP); Hiroyuki Sakane, Anjo (JP); Akira Oga, Kariya (JP); Masatoshi Nakashima, Takahama (JP); Hiroshi Takeda, Nagoya (JP); Masataka Kinoshita, Kariya (JP); Hideaki Kako, Kariya (JP); Kimitake Ishikawa, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 1012 days.

(21) Appl. No.: 14/778,633

(22) PCT Filed: Feb. 14, 2014

(86) PCT No.: PCT/JP2014/000755
§ 371 (c)(1),
(2) Date: Sep. 21, 2015

(87) PCT Pub. No.: WO2014/155940
PCT Pub. Date: Oct. 2, 2014

(65) Prior Publication Data
US 2016/0046174 A1 Feb. 18, 2016

(30) Foreign Application Priority Data

Mar. 29, 2013 (JP) ................................. 2013-071372
Oct. 28, 2013 (JP) ................................. 2013-223581

(51) Int. Cl.
*B60H 1/32* (2006.01)
*F24H 3/02* (2006.01)
(Continued)

(52) U.S. Cl.
CPC ......... *B60H 1/2218* (2013.01); *B60H 1/2215* (2013.01); *B60H 1/2225* (2013.01);
(Continued)

(58) Field of Classification Search
CPC .. B60H 1/2215; B60H 1/2218; B60H 1/2225; F24C 7/04; F24H 3/0429; F24H 9/2071; H05B 1/0236; H05B 3/12; H05B 3/267
(Continued)

(56) References Cited

U.S. PATENT DOCUMENTS

2002/0053601 A1* 5/2002 Kamiya ............. B60H 1/00792
236/49.3
2002/0167227 A1* 11/2002 Matsunaga ........ B60H 1/00428
307/117
(Continued)

FOREIGN PATENT DOCUMENTS

CN 1320087 A 10/2001
JP S6366882 A 3/1988
(Continued)

OTHER PUBLICATIONS

International Search Report and Written Opinion (in Japanese with English Translation) for PCT/JP2014/000755, dated Apr. 28, 2014; ISA/JP.

*Primary Examiner* — Ibrahime A Abraham
*Assistant Examiner* — Justin C Dodson
(74) *Attorney, Agent, or Firm* — Harness, Dickey & Pierce, P.L.C.

(57) ABSTRACT

A radiant heater device includes: a heater main body having a heating portion that generates heat by being supplied with
(Continued)

electric power to radiate radiation heat due to the heat supplied from the heating portion; an output control unit that controls an output of the heating portion; and a maximum output determination unit that determines an upper limit of the output of the heating portion depending on a heat load around the heater main body. The output control unit controls the output of the heating portion depending on the heat load not to exceed the upper limit of the output determined by the maximum output determination unit.

14 Claims, 20 Drawing Sheets

(51) Int. Cl.
F24C 7/04 (2006.01)
B60H 1/22 (2006.01)
H05B 1/02 (2006.01)
H05B 3/12 (2006.01)
H05B 3/26 (2006.01)
F24H 3/04 (2006.01)
F24H 9/20 (2006.01)
G05D 23/19 (2006.01)

(52) U.S. Cl.
CPC ............ *B60H 1/2227* (2019.05); *F24C 7/04* (2013.01); *F24H 3/022* (2013.01); *F24H 3/0429* (2013.01); *F24H 9/2071* (2013.01); *G05D 23/1919* (2013.01); *H05B 1/0236* (2013.01); *H05B 3/12* (2013.01); *H05B 3/267* (2013.01); *B60H 2001/2243* (2013.01); *F24H 2250/02* (2013.01); *H05B 2203/011* (2013.01); *H05B 2203/014* (2013.01); *H05B 2203/032* (2013.01)

(58) Field of Classification Search
USPC .................. 392/347, 375, 407, 432–440
See application file for complete search history.

(56) References Cited

U.S. PATENT DOCUMENTS

| | | | |
|---|---|---|---|
| 2010/0266266 A1* | 10/2010 | Garcia Fabrega | A61L 9/037 392/395 |
| 2011/0127246 A1* | 6/2011 | Heiden | B60L 1/02 219/202 |
| 2012/0061365 A1 | 3/2012 | Okamoto et al. | |
| 2012/0234932 A1* | 9/2012 | Okamoto | F24H 3/002 237/2 R |
| 2012/0253573 A1* | 10/2012 | Shigyo | B60H 1/00421 701/22 |
| 2013/0068440 A1 | 3/2013 | Kamiyama | |
| 2014/0034266 A1 | 2/2014 | Tabei et al. | |
| 2015/0110477 A1 | 4/2015 | Ota et al. | |
| 2016/0059669 A1 | 3/2016 | Sagou et al. | |

FOREIGN PATENT DOCUMENTS

| | | |
|---|---|---|
| JP | H11118159 A | 4/1999 |
| JP | 2001097028 A | 4/2001 |
| JP | 2002324653 A | 11/2002 |
| JP | 2007191137 A | 8/2007 |
| JP | 2008074365 A | 4/2008 |
| JP | 2010111251 A | 5/2010 |
| JP | 2011073657 A | 4/2011 |
| JP | 2011153746 A | 8/2011 |
| JP | 2011246091 A | 12/2011 |
| JP | 2012035844 A | 2/2012 |
| JP | 2012056531 A | 3/2012 |
| JP | 2013052869 A | 3/2013 |
| WO | WO-2011152187 A1 | 12/2011 |
| WO | WO-2012144154 A1 | 10/2012 |

* cited by examiner

RADIANT HEATER DEVICE

CROSS REFERENCE TO RELATED APPLICATIONS

This application is a U.S. National Phase Application under 35 U.S.C. 371 of International Application No. PCT/JP2014/000755 filed on Feb. 14, 2014 and published in Japanese as WO 2014/155940 A1 on Oct. 2, 2014. This application is based on and claims the benefit of priority from Japanese Patent Application No. 2013-071372 filed on Mar. 29, 2013 and Japanese Patent Application No. 2013-223581 filed on Oct. 28, 2013. The entire disclosures of all of the above applications are incorporated herein by reference.

TECHNICAL FIELD

The present disclosure relates to a radiant heater device.

BACKGROUND ART

Patent Literature 1 discloses a radiant heater device. The radiant heater device is disposed to face an occupant and contactable by the occupant in a vehicle interior.

In the radiant heater device of Patent Literature 1, when the occupant comes into contact with the radiant heater device, a temperature of the contact portion with the occupant may change due to an ambient environment, in other words, a heat load. For that reason, a further improvement in the radiant heater device is demanded.

PRIOR ART LITERATURES

Patent Literature

Patent Literature 1: JP 2012-56531 A

SUMMARY OF INVENTION

An object of the present disclosure is to provide a radiant heater device that provides an appropriate heating feeling for a user receiving a radiation heat from a heater.

According to an aspect of the present disclosure, a radiant heater device includes: a heater main body having a heating portion that generates heat by being supplied with electric power to radiate radiation heat due to the heat supplied from the heating portion; an output control unit that controls an output of the heating portion; and a maximum output determination unit that determines an upper limit of the output of the heating portion depending on a heat load around the heater main body. The output control unit controls the output of the heating portion depending on the heat load not to exceed the upper limit of the output determined by the maximum output determination unit.

The heat load around the heater main body is the amount of heat required to be given to the surroundings by the heater main body, and changes according to a required heating capacity. According to the above configuration, because an upper limit of an output of the heating portion is determined according to the heat load, the upper limit of the output can be determined according to the required heating capacity. With the above configuration, the upper limit of the output of the heating portion is set to a high output value when the high heating capacity is required, for example, when the ambient temperature of the heater main body is low. Conversely, when a small heating capacity is allowed, for example, when the ambient temperature of the heater main body is high, the output value is set to be low. Further, the output control unit controls the output of the heating portion according to the heat load so as not to exceed the upper limit of the output. For that reason, the radiant heater device is obtained, in which the heating portion does not conduct the unnecessary output relative to the heat load. Therefore, the radiant heater device can provide appropriate heating feeling when a user receives the radiation heat from the heater main body, and a portion in contact with an object such as the user has an appropriate temperature.

DESCRIPTION OF EMBODIMENTS

Figure 1:
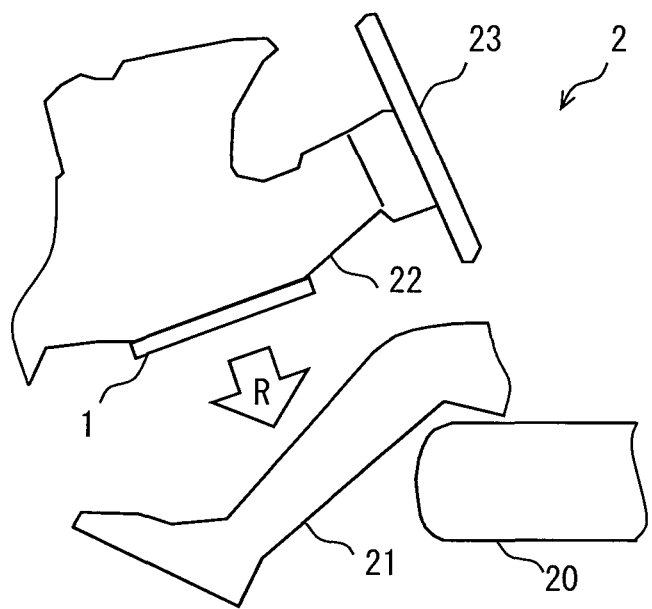
FIG. 1 is a schematic view illustrating a positional relationship between a radiant heater device according to a first embodiment and an occupant.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

The present disclosure is applicable to a radiant heater device 1 which is installed in an interior of a moving body such as vehicle to drive on a road, ship, or aircraft, or an interior of a building fixed to the land. Referring to FIG. 1, the device 1 according to a first embodiment configures a part of a heating system 2 for a vehicle interior. The device 1 is an electric heater to generate heat, and is powered by a power supply such as a battery mounted in the moving body or a power generator. The device 1 is formed into a thin plate. The device 1 is powered to generate the heat. The device 1 radiates a radiant heat R mainly in a direction perpendicular to a surface of the device 1 for the purpose of heating an object located in the direction perpendicular to the surface.

A seat 20 on which an occupant 21 is to be seated is installed in the vehicle interior. The device 1 is installed in the interior to radiate the radiant heat R toward feet of the occupant 21. The device 1 is installed on a wall surface of the interior. The wall surface of the interior is an interior part such as an instrument panel, a door trim, or a ceiling. The device 1 is installed to face the occupant 21 with an expected normal posture. For example, the vehicle to drive on a road has a steering column 22 for supporting a steering wheel 23. The device 1 can be installed on a lower surface of the steering column 22 so as to face the occupant 21.

Figure 2:
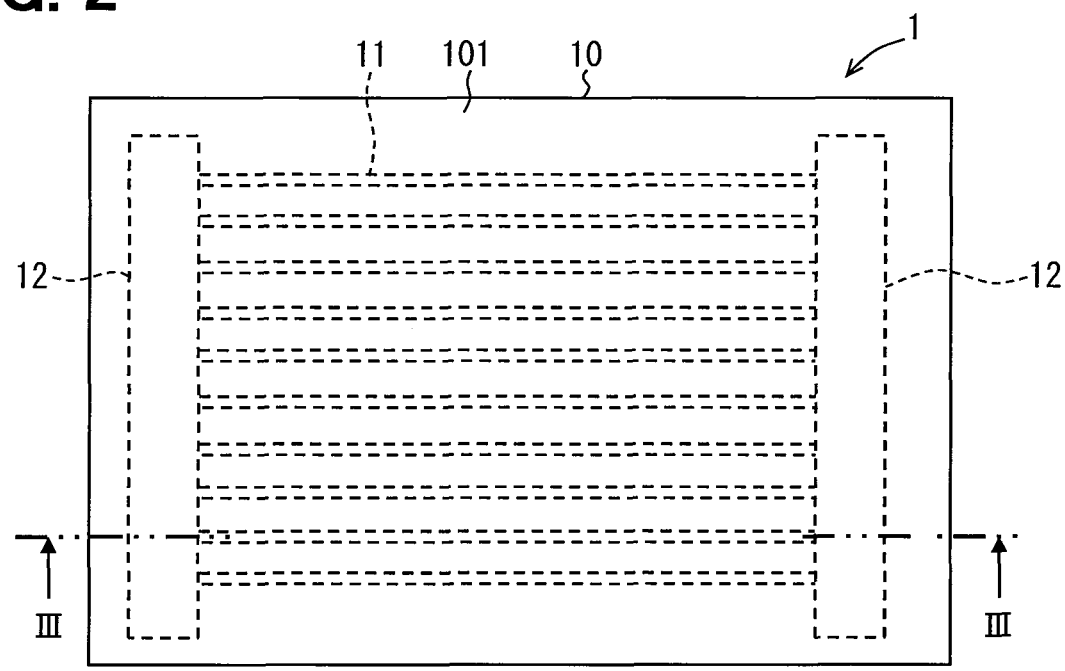
FIG. 2 is a top view of the radiant heater device according to the first embodiment.
Figure 3:
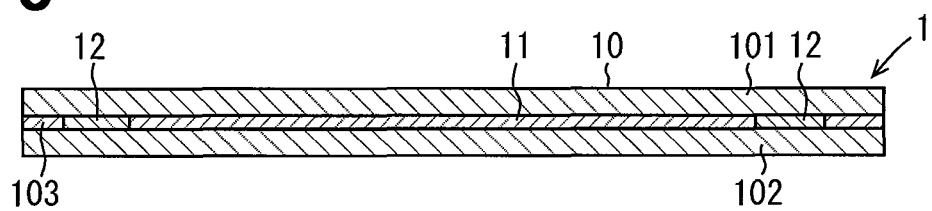
FIG. 3 is a cross-sectional view of the radiant heater device according to the first embodiment.

As illustrated in FIG. 2, the device 1 is formed in a substantially rectangular thin plate. The device 1 includes a substrate portion 10 configuring a heater main body, multiple heating portions 11, and a pair of terminals 12 which is a conductive part. The device 1 can be also called "surface heater" that radiates the radiant heat R mainly in the direction perpendicular to the surface.

The substrate portion 10 is made of a resin material that provides excellent electric insulation properties, and withstands a high temperature. The substrate portion 10 is a multilayer substrate. The substrate portion 10 includes a front surface layer 101, a rear surface layer 102, and an intermediate layer 103. The radiant heat R is radiated from the front surface layer 101 in a radial direction. In other words, the front surface layer 101 is arranged to face a part of the occupant 21 which is an object to be heated in an installed state of the device 1. The rear surface layer 102 forms a back surface of the device 1. The intermediate layer 103 supports the heating portions 11 and the terminals 12. The substrate portion 10 is a member for supporting the multiple heating portions 11 each of which is linear. The front surface layer 101, the rear surface layer 102, and the intermediate layer 103 are an insulating part made of a material lower in thermal conductivity than the heating portions 11 and the terminals 12. For example, the front surface layer 101, the rear surface layer 102, and the intermediate layer 103 are made of polyimide resin.

Each of the multiple heating portions 11 is made of a material that is energized to generate heat. The heating portions 11 can be made of metal material. For example, the heating portions 11 can be made of copper, silver, tin, stainless steel, nickel, or nichrome. Each of the multiple heating portions 11 is formed into a linear shape or a plate shape which is in parallel to the surface of the substrate portion 10, and dispersed over the surface of the substrate portion 10.

Each of the heating portions 11 is connected to the pair of terminals 12 arranged at a predetermined interval. The heating portions 11 are spaced from each other between the pair of terminals 12. The multiple heating portions 11 are connected in parallel to the pair of terminals 12 so as to bridge between the pair of terminals 12, and disposed over the substantially overall surface of the substrate portion 10. The multiple heating portions 11 are disposed to be interposed between the front surface layer 101 and the rear surface layer 102 together with the intermediate layer 103. The multiple heating portions 11 are protected from an external by the substrate portion 10.

The respective heating portions 11 are members that are thermally connected to at least the front surface layer 101 and energized to generate heat. With the above configuration, the heat generated by the heating portions 11 is transmitted to the front surface layer 101. The heat generated by one of the heating portions 11 is radiated from the front surface layer 101 toward the external as a radiant heat through a member such as the substrate portion 10, and supplied to the occupant 21.

The heating portions 11 are each set to have a predetermined length for the purpose of obtaining a predetermined amount of heat generation. Therefore, each of the heating portions 11 is set to have a predetermined resistance. Each of the heating portions 11 has a dimension and a shape set so that a thermal resistance in a lateral direction has a predetermined value. With the above configuration, the multiple heating portions 11 generate the predetermined amount of heat when a predetermined voltage is applied. The multiple heating portions 11 generate the predetermined amount of heat, and rise to a predetermined temperature. The multiple heating portions 11 with the predetermined temperature heat the front surface layer 101 to have a predetermined radiation temperature. The device 1 can radiate a radiant heat R that allows the occupant 21, that is, a person to feel warm.

The output, the temperature, and the amount of heat generation of the heating portion 11 are controlled by an output control unit 30 of a heater ECU 3. The output control unit 30 can control the output, the temperature, and the amount of heat generation of the heating portion 11 by controlling a voltage value and a current value to be given to the heating portion 11. Therefore, the output control unit 30 can change the amount of radiant heat to be given to the occupant 21. When the energization of the device 1 is started by the output control unit 30, a surface temperature of the device 1 rapidly rises up to the predetermined radiation temperature to be controlled. This makes it possible to rapidly give warmth to the occupant 21 even in winter.

When an object comes in contact with the front surface layer 101 of the device 1, the heat transmitted from the heating portion 11 to the front surface layer 101 is rapidly transmitted to the contact object. This results in a rapid reduction in the temperature of the contact portion of the front surface layer 101. Hence, the surface temperature of the device 1 on the portion with which the object comes in contact is rapidly reduced. The heat of the portion with which the object comes in contact is transmitted to the contact object, and diffused into the contact object. For that reason, an excess rise of the surface temperature of the contact object is suppressed.

The heater ECU 3 is a control device for controlling the operation of the device 1. The heater ECU 3 includes at least the output control unit 30, a maximum output determination unit 31, an output setting unit 32, and a storage unit 33.

Figure 6:
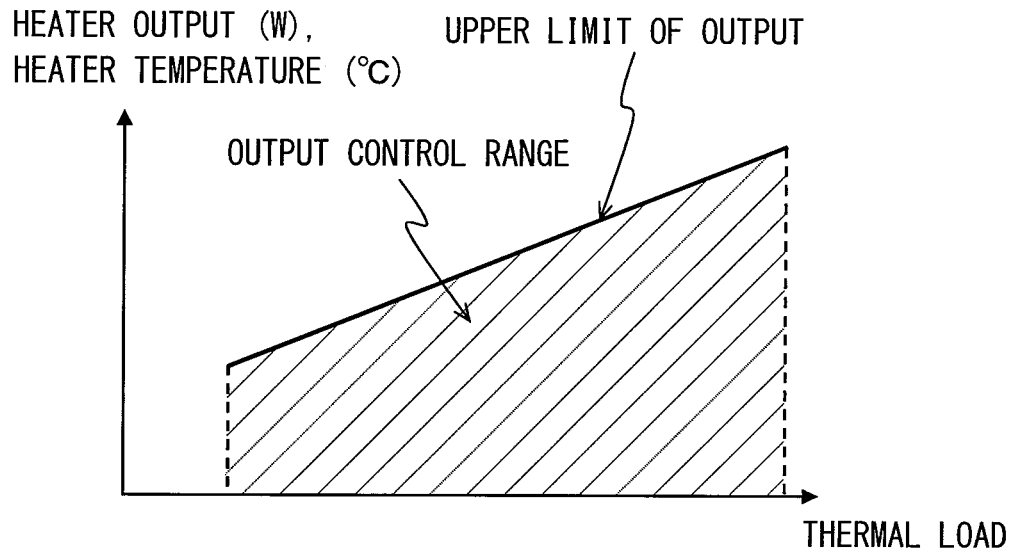
FIG. 6 is a control characteristic graph illustrating a relationship between an output control range and an upper limit of an output with respect to a heat load in the radiant heater device according to the first embodiment.

As illustrated in FIG. 6, the maximum output determination unit 31 determines an upper limit of the output from the heating portion 11 according to a heat load around the device 1. Predetermined control characteristic data illustrated in FIG. 6 is stored in the storage unit 33 in advance. The maximum output determination unit 31 determines the upper limit of the output according to the control characteristic data so that the upper limit of the output increases more as the heat load increases more. For example, the upper limit of the output is set so that the heat load and the output value establish a relationship of a linear expression. The upper limit of the output is set so that the heat load and the temperature of the heater establish the relationship of the linear expression. Therefore, the maximum output determination unit 31 controls the output value and the temperature of the heater to be lower as the heat load is lower, and controls the output value and the temperature of the heater to be higher as the heat load is higher.

The output setting unit 32 can set the output level of the heating portion 11. The output level can be set by predetermined multiple steps. Even if the heating portion 11 is set to any output level by the output setting unit 32, the output control unit 30 controls the output of the heating portions 11 so as not to exceed the upper limit of the output which is determined by the maximum output determination unit 31. The output level of the heating portion 11 may be determined by calculation using a predetermined program in automatic operation, or may be determined according to an instruction signal transmitted by allowing an output level operation unit to be operated by the occupant.

The output control unit 30 controls the output of the heating portion 11 depending on the heat load so as not to exceed the upper limit of the output determined by the maximum output determination unit 31 according to predetermined control characteristic data illustrated in FIG. 6. The output control unit 30 controls the output and the temperature of the heater in an output range included in a hatched region in FIG. 6. The output control unit 30 can supply an electric power obtained from a battery 4 to the device 1, and control the supply power. The output control unit 30 can control the output of the heating portion 11 under the power control.

The battery 4 may be configured by, for example, an assembled battery having an aggregation of multiple unit cells. Each of the unit cells can be formed of, for example, a nickel-hydrogen secondary battery, a lithium ion secondary battery, or an organic radical battery. The battery 4 is chargeable and dischargeable, and can be used to supply an electric power to a vehicle travel motor.

The heater ECU 3 is configured to perform arithmetic processing and control processing with the supply of a DC power from the battery 4 which is a vehicle power supply mounted in the vehicle, regardless of on/off states of an ignition switch that controls start and stop of an engine. The heater ECU 3 is configured to receive various switch signals from various operation switches on an operation panel which is installed integrally with the instrument panel.

Figure 5:
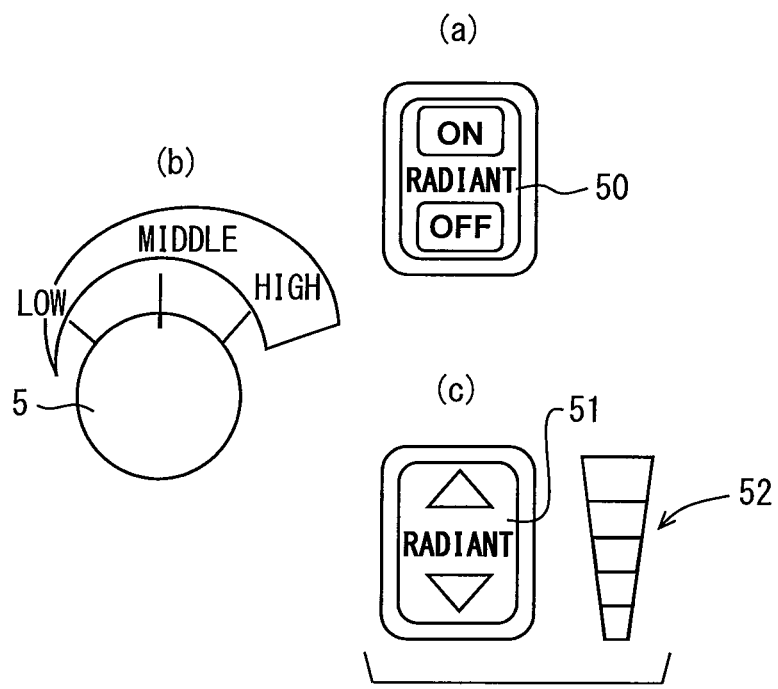
FIG. 5 is a diagram illustrating multiple examples of an output level operation unit of the radiant heater device according to the first embodiment.

As illustrated in FIG. 5, the various operation switches include an on/off switch 50, a level setting dial 5, and a level setting switch 51. The on/off switch 50 illustrated in FIG.

5(a) is a driving operation unit having on/off buttons operated by the occupant for the purpose of driving and stopping the device 1. When the on/off button of the on/off switch 50 is operated by the occupant, the output control unit 30 is instructed to drive or stop the device 1. The level setting dial 5 illustrated in FIG. 5(b) is an output level operation unit that is dialed to a predetermined position by the occupant to set the output level of the heating portion 11, and instructs the output setting unit 32 on the set output level. In the level setting dial 5, the output level can be set to, for example, three steps of "high", "middle", and "low".

The level setting switch 51 illustrated in FIG. 5(c) is an output level operation unit having a level up switch and a level down switch operated by the occupant to set the output level of the heating portion 11 and instructs the output setting unit 32 on the set output level. In the level setting switch 51, for example, the output level can be set to one of multiple steps so as to be indicated by a lighting length of an indicator 52.

The heater ECU 3 is provided with a microcomputer including functions of a CPU (central processing unit) that performs arithmetic processing and control processing, a memory such as a ROM or a RAM, and an I/O port (input/output circuit). The signals from various detection units 6 are subjected to A/D conversion by the I/O port or an A/C converter circuit, and therefore input to the microcomputer. The CPU configures the maximum output determination unit 31, the output setting unit 32, and the output control unit 30.

The memory such as the ROM or the RAM configures the storage unit 33 of the heater ECU 3. The storage unit 33 stores predetermined control characteristic data in advance. The control characteristic data is used to determine the output of the heating portion 11 relative to the heat load depending on the output level of the heating portion 11 which is set by the output setting unit 32.

The heat load around the heater main body is the amount of heat required to be given to the surroundings by the heater main body. The heat load around the device 1 is the amount of heat required for heating which is calculated on the basis of at least one of an inside air temperature, an outside air temperature, and the amount of solar radiation irradiated to a vehicle interior. The heat load changes depending on a heating capacity required for the vehicle interior in which the device 1 is present. Therefore, when the heat load is large, the required heating capacity is large, and the temperature around the device 1 is relatively low. When the heat load is small, the required heating capacity is small, and the temperature around the device 1 is relatively high.

Figure 4:
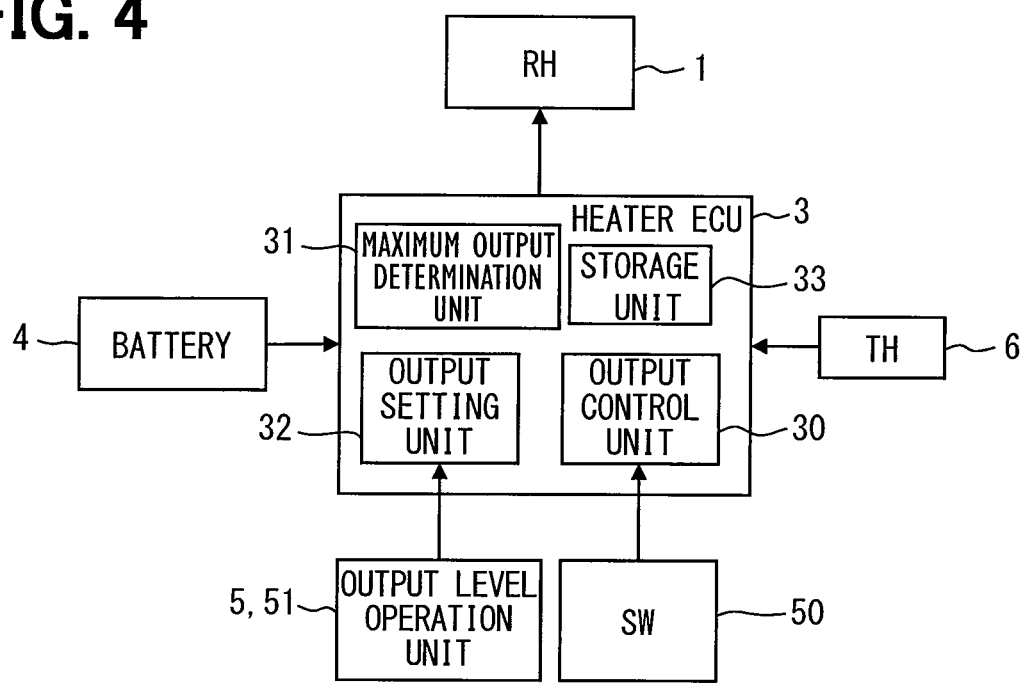
FIG. 4 is a block diagram illustrating the radiant heater device according to the first embodiment.

The inside air temperature is a temperature in the vehicle interior in which the device 1 is disposed, which is an ambient temperature of the device 1. The inside air temperature can be detected by an inside air temperature sensor mounted in the vehicle. The outside air temperature is a temperature outside of the vehicle interior in which the device 1 is disposed, which is an air temperature outside of the vehicle. The outside air temperature can be detected by an outside air temperature sensor mounted in the vehicle. The amount of solar radiation is irradiated to the vehicle interior in which the device 1 is disposed, and can be detected by, for example, an IR sensor mounted in the vehicle. Therefore, the various detection units 6 in FIG. 4 include the inside air temperature sensor, the outside air temperature sensor, and the IR sensor.

The heat load around the heater main boy is the amount of heat required for heating which is calculated on the basis of at least one of the inside air temperature, the outside air temperature, and the amount of solar radiation. For that reason, the heat load that is likely to be directly felt by the occupant 21 can be employed as a parameter for determining the output of the heating portion 11. Therefore, the device 1 can enhance a precision in calculation of the heating feeling given to the occupant 21.

The heater ECU 3 may be configured to be communicatable with the air conditioning ECU. The air conditioning ECU is a control device for controlling the air conditioning of the vehicle interior. The air conditioning ECU outputs control signals to actuators for respective mode doors, a motor driver circuit of a blower motor, a capacity control valve of a compressor, and a clutch driver circuit of an electromagnetic clutch, and controls various air conditioning function components. Therefore, the heater ECU 3 can realize the operation of the radiant heater device 1 in conjunction with the air conditioning operation made by the air conditioning ECU.

Figure 7:
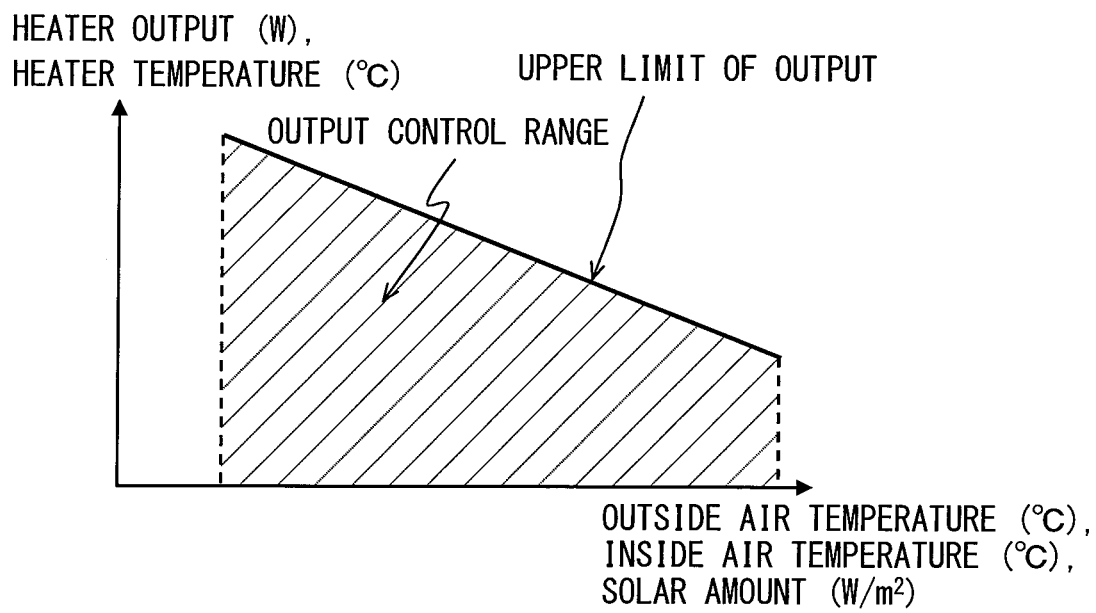
FIG. 7 is a control characteristic graph illustrating a relationship between the output control range and the upper limit of the output with respect to an inside air temperature etc. in the radiant heater device according to the first embodiment.

The maximum output determination unit 31 determines the upper limit of the output of the heating portion 11 depending on at least one of the outside air temperature, the inside air temperature, and the amount of solar radiation according to predetermined control characteristic data illustrated in FIG. 7. The predetermined control characteristic data illustrated in FIG. 7 is stored in the storage unit 33 in advance. The maximum output determination unit 31 determines the upper limit of the output reduced more as the outside air temperature, the inside air temperature, and the amount of solar radiation increase more. For example, the upper limit of the output is set so that the outside air temperature, the inside air temperature, or the amount of solar radiation, and the output value establish a relationship of a linear expression. The upper limit of the output is set so that the outside air temperature, the inside air temperature, or the amount of solar radiation, and the temperature of the heater establish the relationship of the linear expression. Therefore, the maximum output determination unit 31 controls the output value and the temperature of the heater to be higher as the outside air temperature, the inside air temperature, and the amount of solar radiation are lower, and controls the output value and the temperature of the heater to be lower as the outside air temperature, the inside air temperature, and the amount of solar radiation are higher.

The heat load can be calculated through the following expression with the use of the outside air temperature, the inside air temperature, and the amount of solar radiation:

$$\text{Heat load} = a \times f(\text{outside air temperature (° C.)}) + b \times g(\text{inside air temperature (° C.)}) + c \times h(\text{the amount of solar radiation (W/m}^2\text{)})$$

where a, b, and c are constants, and f(x), g(y), and h(z) are functions with the outside air temperature, the inside air temperature, and the amount of solar radiation as variables, respectively.

In obtaining the heat load, at least one of the outside air temperature, the inside air temperature, and the amount of solar radiation is used as the variable. Therefore, for example, the function used when using only the outside air temperature as the variable is only f(x), and the functions used when using the outside air temperature and the amount of solar radiation as the variables are f(x) and h(z).

The output control unit 30 controls the output of the heating portion 11 depending on the outside air temperature, the inside air temperature, and the amount of solar radiation so as not to exceed the upper limit of the output which is determined by the maximum output determination unit 31, as illustrated in FIG. 7. The output control unit 30 controls the output and the temperature of the heater in an output range included in a hatched region in FIG. 7.

Figure 8:
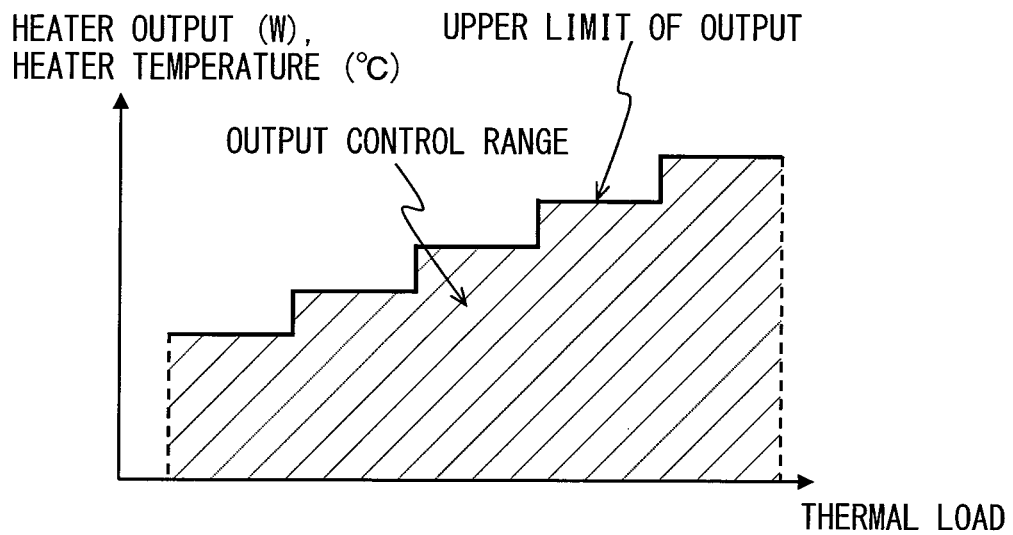
FIG. 8 is a control characteristic graph illustrating a first modification of the control characteristic graph in FIG. 6.

FIG. 8 illustrates a first modification of a control characteristic graph illustrated in FIG. 6. Predetermined control characteristic data illustrated in FIG. 8 is stored in the storage unit 33 in advance. The maximum output determination unit 31 determines an upper limit of the output from the heating portion 11 depending on the heat load around the device 1 according to the predetermined control characteristic data illustrated in FIG. 8. The upper limit of the output illustrated in FIG. 8 has such a characteristic that the output value and the temperature of the heater stepwise increase as the heat load increases more. Therefore, the maximum output determination unit 31 may control the output value and the temperature of the heater to stepwise decrease as the heat load decreases more, and control the output value and the temperature of the heater to stepwise increase as the heat load increases more.

The output control unit 30 controls the output of the heating portion 11 depending on the heat load so as not to exceed the upper limit of the output determined by the maximum output determination unit 31 as illustrated in FIG. 8. The output control unit 30 controls the output and the temperature of the heater in an output range included in a hatched region in FIG. 8.

Figure 9:
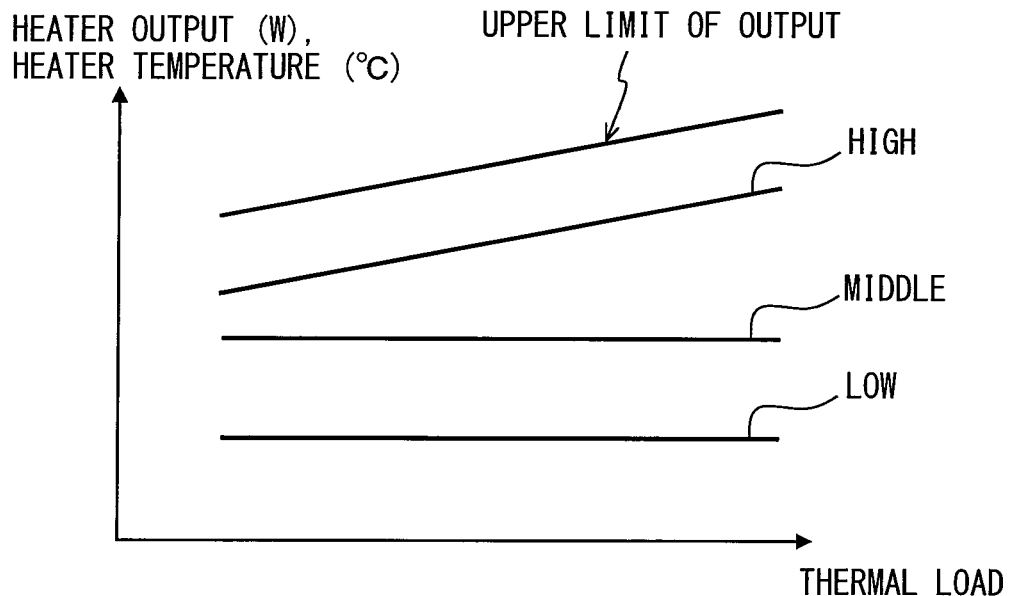
FIG. 9 is a control characteristic graph illustrating a relationship between multiple output levels to be set and the upper limit of the output with respect to the heat load in the radiant heater device according to the first embodiment.

A control characteristic graph illustrated in FIG. 9 illustrates a relationship between settable output levels and the upper limit of the output with respect to the heat load. Predetermined control characteristic data illustrated in FIG. 9 is stored in the storage unit 33 in advance.

The output levels set by the output setting unit 32 can be set to three steps of "high", "middle", and "low" according to predetermined control characteristic data illustrated in FIG. 9. Even when the output level is set to "high" which is the maximum output level by the output setting unit 32, the output control unit 30 controls the output of the heating portion 11 not to exceed the upper limit of the output which is determined by the maximum output determination unit 31. Therefore, the output control unit 30 controls the output of the heating portion 11 according to the characteristic lines of "high", "middle", and "low" illustrated in FIG. 9 depending on the set output level. In the predetermined control characteristic data illustrated in FIG. 9, the level "high" is set so that the output value and the temperature of the heater decrease more as the heat load decreases more, and the output value and the temperature of the heater increase gradually as the heat load increases more, and in the levels "middle" and "low", the output value and the temperature of the heater are maintained constant without depending on the heat load.

Figure 10:
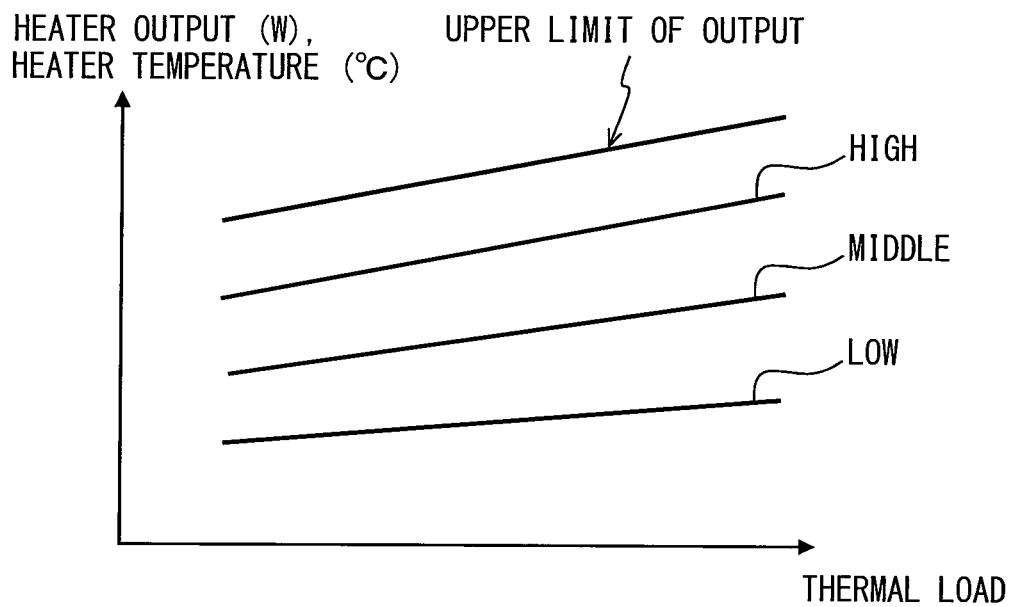
FIG. 10 is a control characteristic graph illustrating a first modification of the control characteristic graph in FIG. 9.

As with predetermined control characteristic data illustrated in FIG. 10, all of the levels of "high", "middle", and "low" may be set so that the output value and the temperature of the heater decrease more as the heat load decreases more, and the output value and the temperature of the heater increase gradually as the heat load increases more. The predetermined control characteristic data illustrated in FIG. 10 is stored in the storage unit 33 in advance. As compared with a case in which the level is maintained at a constant value, in the levels of "middle" and "low", since the occupant 21 feels the heating capacity to be enhanced with an increase in the heat load, the heating feeling can be realized. As a result, the number of operation for increasing the output level by the occupant 21 can be reduced because the occupant is restricted from feeling the heating to be low.

Figure 11:
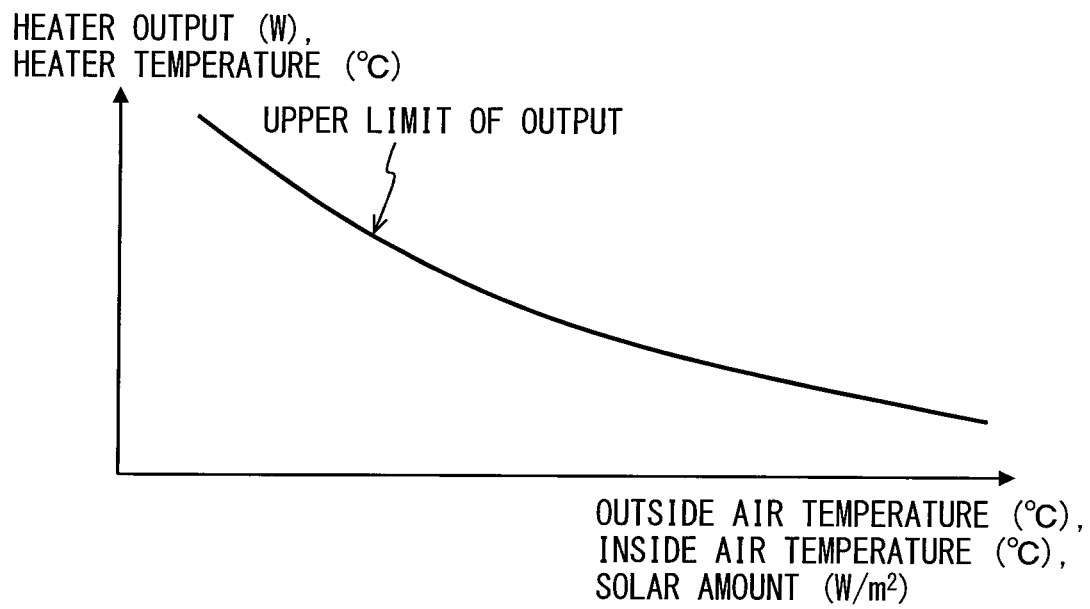
FIG. 11 is a control characteristic graph illustrating a first modification of the control characteristic graph in FIG. 7.

The maximum output determination unit 31 may determine the upper limit of the output of the heating portion 11 depending on at least one of the outside air temperature, the inside air temperature, and the amount of solar radiation according to predetermined control characteristic data illustrated in FIG. 11. The predetermined control characteristic data illustrated in FIG. 11 is stored in the storage unit 33 in advance. The control characteristic graph illustrated in FIG. 11 is a first modification of FIG. 7. In the predetermined control characteristic data, at least one of the outside air temperature, the inside air temperature, and the amount of solar radiation establishes an inverse proportion to the output and the temperature of the heater. The output control unit 30 controls the output and the temperature of the heater in an output range lower than or equal to an upper limit line of the output in FIG. 11.

Figure 12:
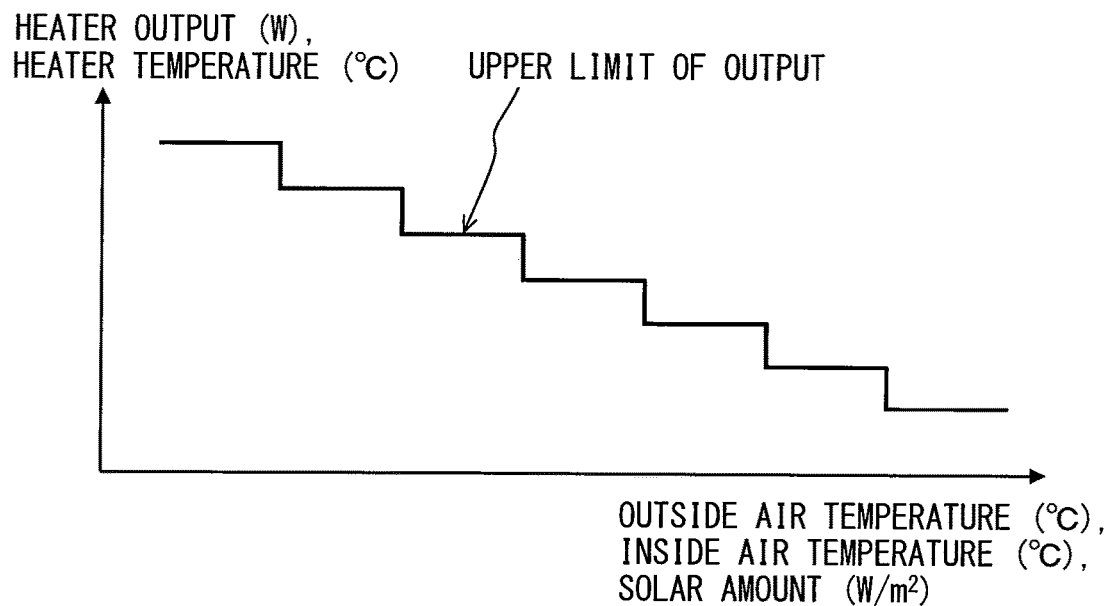
FIG. 12 is a control characteristic graph illustrating a second modification of the control characteristic graph in FIG. 7.

The maximum output determination unit 31 may determine the upper limit of the output of the heating portion 11 depending on at least one of the outside air temperature, the inside air temperature, and the amount of solar radiation according to predetermined control characteristic data illustrated in FIG. 12. The predetermined control characteristic data illustrated in FIG. 12 is stored in the storage unit 33 in advance. The control characteristic graph illustrated in FIG. 12 is a second modification of FIG. 7.

The upper limit of the output illustrated in FIG. 12 has such a characteristic that the output value and the temperature of the heater stepwise decrease as the outside air temperature increases more. Therefore, the maximum output determination unit 31 controls the output value and the temperature of the heater to stepwise increase as the outside air temperature decreases more, and controls the output value and the temperature of the heater to stepwise decrease as the outside air temperature increases more. The output control unit 30 controls the output and the temperature of the heater in an output range lower than or equal to an upper limit line of the output in FIG. 12.

Figure 13:
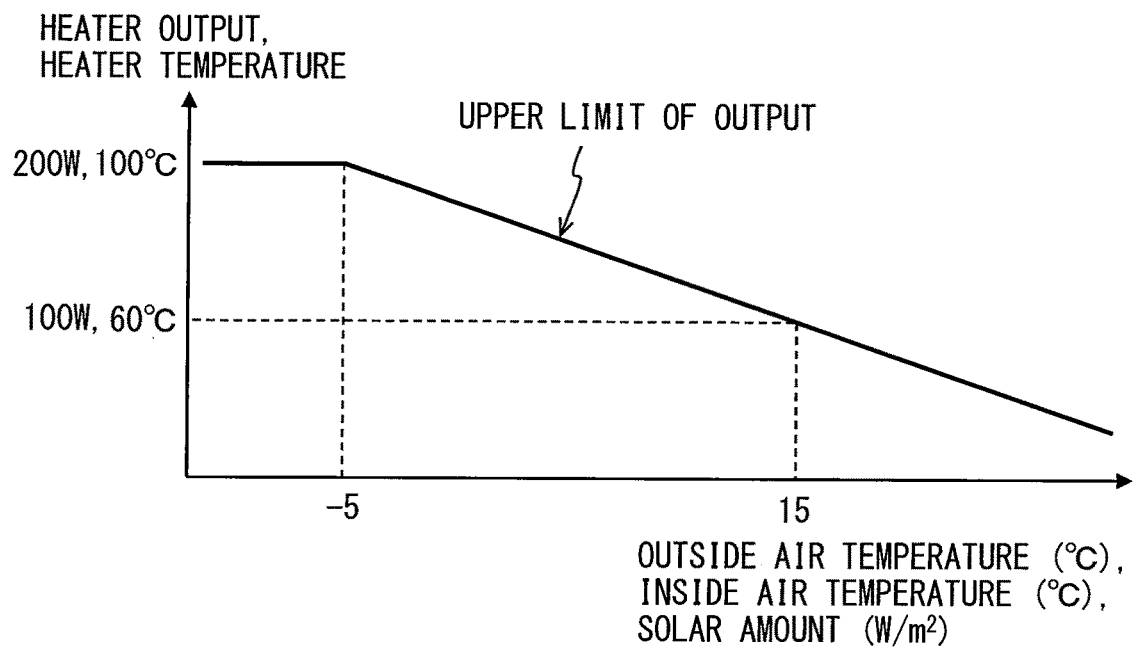
FIG. 13 is a control characteristic graph illustrating a third modification of the control characteristic graph in FIG. 7.

The maximum output determination unit 31 may determine the upper limit of the output of the heating portion 11 depending on at least one of the outside air temperature, the inside air temperature, and the amount of solar radiation according to predetermined control characteristic data illustrated in FIG. 13. The predetermined control characteristic data illustrated in FIG. 13 is stored in the storage unit 33 in advance. The control characteristic graph illustrated in FIG. 13 is a third modification of FIG. 7.

Similar to FIG. 7, an upper limit of the output illustrated in FIG. 13 is determined to decrease more as the outside air temperature, the inside air temperature, and the amount of solar radiation increase more. A difference from FIG. 7 resides in that the upper limit of the output is maintained at a constant value when the outside air temperature, the inside air temperature, and the amount of solar radiation are lower than or equal to a predetermined value. Therefore, the maximum output determination unit 31 controls the output value and the temperature of the heater to gradually decrease as the outside air temperature etc. increases more, and controls the output value and the temperature of the heater to be maintained at a constant value as the outside air temperature etc. is lower than or equal to the predetermined value. The output control unit 30 controls the output and the temperature of the heater in an output range lower than or equal to an upper limit line of the output in FIG. 13. According to the above control characteristic, the heater surface temperature and the radiant heat can be restrained from becoming too high while the heating feeling of the occupant 21 is maintained when the outside air temperature, the inside air temperature, and the amount of solar radiation are lower than or equal to the predetermined value.

Figure 14:
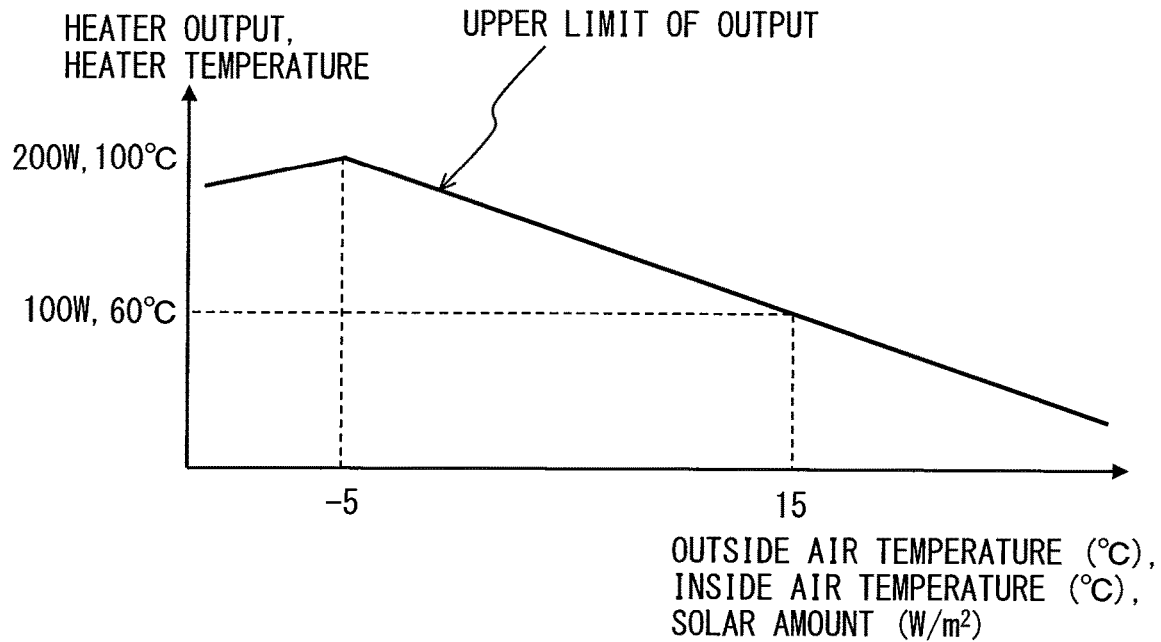
FIG. 14 is a control characteristic graph illustrating a fourth modification of the control characteristic graph in FIG. 7.

The maximum output determination unit 31 may determine the upper limit of the output of the heating portion 11 depending on at least one of the outside air temperature, the inside air temperature, and the amount of solar radiation according to predetermined control characteristic data illustrated in FIG. 14. The predetermined control characteristic data illustrated in FIG. 14 is stored in the storage unit 33 in advance. A control characteristic graph illustrated in FIG. 14 is a fourth modification of FIG. 7, and is different from the control characteristic graph illustrated in FIG. 13 in that when the outside air temperature etc. is lower than or equal to the predetermined value, the output value and the temperature of the heater decrease more as the outside air temperature decreases more.

The output control unit 30 controls the output and the temperature of the heater in an output range lower than or equal to an upper limit line of the output in FIG. 14. According to the above control characteristic, the heater surface temperature and the radiant heat can be restrained from becoming too high while the heating feeling of the occupant 21 is maintained when the outside air temperature, the inside air temperature, and the amount of solar radiation are lower than or equal to the predetermined value.

Figure 15:
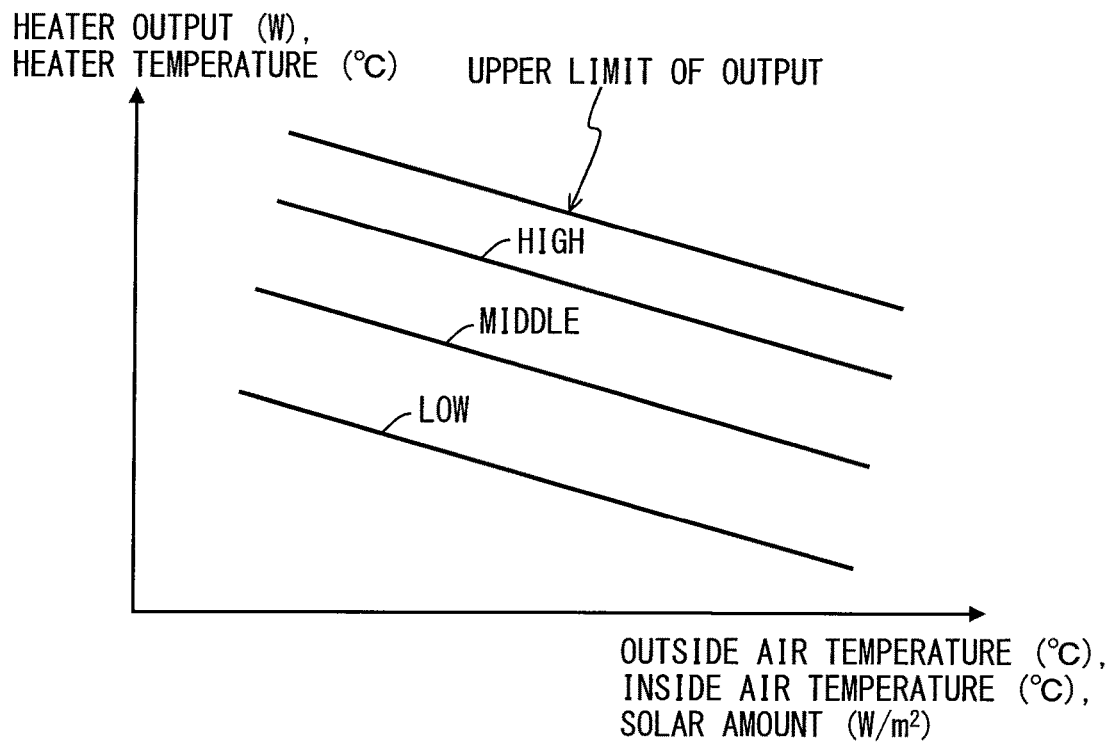
FIG. 15 is a control characteristic graph illustrating a relationship between multiple output levels to be set and the upper limit of the output with respect to an inside air temperature etc. in the radiant heater device according to the first embodiment.

A control characteristic graph illustrated in FIG. 15 illustrates a relationship between settable output levels and the upper limit of the output with respect to the outside air temperature etc. The predetermined control characteristic data illustrated in FIG. 15 is stored in the storage unit 33 in advance.

The output levels set by the output setting unit 32 can be set to three steps of "high", "middle", and "low" as illustrated in FIG. 15. Even when the output level is set to "high" which is the maximum output level by the output setting unit 32, the output control unit 30 controls the output of the heating portion 11 not to exceed the upper limit of the output which is determined by the maximum output determination unit 31. Therefore, the output control unit 30 controls the output of the heating portion 11 according to the characteristic lines of "high", "middle", and "low" illustrated in FIG. 15 depending on the set output level. In the predetermined control characteristic data illustrated in FIG. 15, the respective levels of "high", "middle", and "low" are set so that the output value and the temperature of the heater increase more as the outside air temperature decreases more, and the output value and the temperature of the heater decrease gradually as the outside air temperature increases more.

Then, the operational advantages of the radiant heater device 1 according to the first embodiment will be described. The radiant heater device 1 includes the substrate portion 10 that radiates the radiant heat, the output control unit 30 that controls the output of the heating portion 11, and the maximum output determination unit 31 that determines the upper limit of the output of the heating portion 11 according to the heat load around the substrate portion 10. The output control unit 30 controls the output of the heating portion 11 depending on the heat load so as not to exceed the upper limit of the output determined by the maximum output determination unit 31.

According to the above control, the upper limit of the output of the heating portion 11 is determined according to the heat load that changes depending on the required heating capacity. This makes it possible to determine the upper limit of the output of the heating portion 11 depending on the required heating capacity. As a result, the upper limit of the output of the heating portion 11 is set to the higher output value when the larger heating capacity is required, for example, when the inside air temperature, the outside air temperature, and the amount of solar radiation are lower. The upper limit of the output of the heating portion 11 is set to the lower output value when the smaller heating capacity is allowed, for example, when the amount of solar radiation is higher. The output control unit 30 controls the output of the heating portion 11 depending on the heat load so as not to exceed the upper limit of the output determined as described above. For that reason, the radiant heater device 1 in which the heating portion 11 do not perform unnecessary output to the heat load can be realized. Therefore, when the occupant 21 is subject to the radiant heat from the heater device, the appropriate heating feeling is obtained. Further, the radiant heater device in which the temperature of the portion with which the object such as a person comes in contact becomes an appropriate temperature is obtained.

The radiant heater device 1 obtains the following advantages. When the inside air temperature (ambient temperature) is low, the occupant 21 hardly feels warmth. Therefore, according to the radiant heater device 1, with an increase in the output of the heating portion 11, the heating feeling can be raised even if the occupant feels cold in the interior. In addition, according to the radiant heater device 1, when the inside air temperature (ambient temperature) is low, because a skin temperature of the occupant 21 is low, the surface temperature of the heater decreases when a human body contacts with the heater by increasing the temperature of the heating portion 11, and therefore the occupant 21 hardly feels hot.

When the inside air temperature (ambient temperature) is high, the occupant 21 is likely to feel warmth. Therefore, according to the radiant heater device 1, with a decrease in the output of the heating portion 11, the occupant 21 obtains the heating feeling even if the surface temperature of the heater is low. In addition, according to the radiant heater device 1, when the inside air temperature (ambient temperature) is high, because the skin temperature of the occupant 21 also increases, the surface temperature of the heater decreases when the human body contacts with the heater by decreasing the temperature of the heating portion 11, and therefore the occupant 21 hardly feels hot.

Further, the output control unit 30 controls the output of the heating portion 11 which is determined depending on the heat load according to the control characteristic data so as not to exceed the upper limit of the output which is determined by the maximum output determination unit 31 even if the output level is the maximum level.

According to the above configuration, even when the output level of the device 1 is set to the maximum, the output control unit 30 controls the output of the heating portion 11 so as not to exceed the upper limit of the output which is determined by the maximum output determination unit 31. For that reason, since the person that is subject to the radiant heat can obtain the heating feeling that is not too hot depending on the heat load, the radiant heater device 1 that can provide the appropriate heating feeling is obtained.

The output setting unit 32 is instructed on the output level of the heating portion 11 by the operation of the output level operation unit (level setting dial 5, etc.). According to the above configuration, the occupant 21 can set the output level of the heating portion 11 depending on a sensory temperature. As a result, the radiant heater device 1 that suitably works with the preference of the individual occupants 21 is obtained.

According to the radiant heater device 1, the control characteristic data for determining the output of the heating portion 11 relative to the heat load depending on the output level of the heating portion 11 which is set by the occupant 21 is stored in the storage unit 33 in advance. According to the above configuration, the control characteristic data depending on multiple output levels or an arbitrary output level is stored in advance with the results that the setting and control of the heater temperature can be implemented through no complicated calculation.

Second Embodiment

A second embodiment will be described with reference to FIGS. 16 and 17. In the second embodiment, components denoted by the same symbols as those in the drawings according to the first embodiment and configurations not described are identical with those in the first embodiment, and the same advantages are obtained.

An output control unit 30 of a heater ECU 3 according to the second embodiment executes a process of prohibiting the energization of heating portion 11 when receiving a signal indicating that a vehicle has collided or is likely to collide. Therefore, the output control unit 30 stops the operation of a device 1 when the above condition is established.

Figure 16:
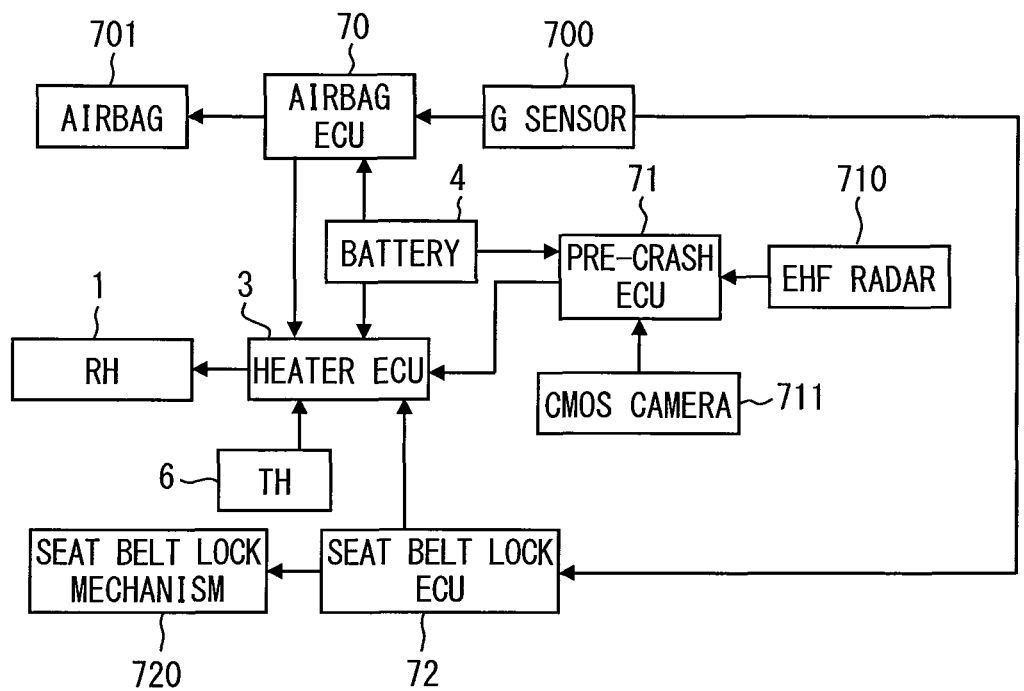
FIG. 16 is a block diagram illustrating a radiant heater device according to a second embodiment.
Figure 17:
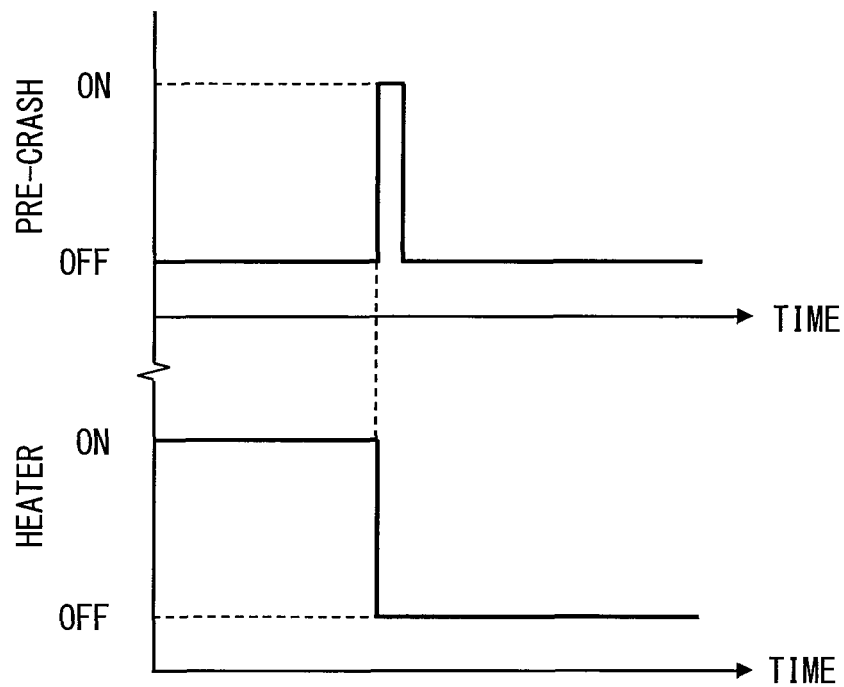
FIG. 17 is a time chart illustrating a relationship between a pre-crash operation and a heater operation in the radiant heater device according to the second embodiment.

As illustrated in FIG. 16, the heater ECU 3 can communicate with an airbag ECU 70, a pre-crash ECU 71, and a seatbelt lock ECU 72, and recognizes that the vehicle has collided or is likely to collide on the basis of information from those ECUs. The airbag ECU 70, the pre-crash ECU 71, and the seatbelt lock ECU 72 are also configured to operate with an electric power supplied from a battery 4 as an operating power.

A G sensor 700 is disposed, for example, on a vehicle body frame of a vehicle front end. When the G sensor 700 detects an acceleration of a specified value or more upon the collision of the vehicle front end with, for example, a preceding vehicle or an obstacle, the G sensor 700 outputs a collision detection signal to the airbag ECU 70. An airbag 701 is fitted to, for example, a steering, and disposed in a driver's seat front portion. When receiving a collision detection signal from the G sensor 700, the airbag ECU 70 outputs the collision detection signal corresponding to the collision of the vehicle to the heater ECU 3. The output control unit 30 of the heater ECU 3 stops power feeding to the device 1, and the operation of the device 1 stops.

The airbag ECU 70 ignites an inflator, for example, 10 milliseconds after the collision detection signal is output, and injects gas into the airbag 701 to deploy the airbag 701. The airbag 701 discharges the gas, for example, 10 milliseconds after the deployment has been completed, and deflates the airbag 701. A driver is restrained by the airbag 701 with the deployment of the airbag 701, and released from the airbag 701 with the deflation of the deployed airbag 701.

The pre-crash ECU 71 analyzes a radar signal from a millimeter wave radar 710 and a video signal from a CMOS camera 711 to determine whether there is a possibility that the vehicle will collide, or not. When the pre-crash ECU 71 determines that there is the possibility that the vehicle will collide, the pre-crash ECU 71 outputs a pre-crash signal to the heater ECU 3. The output control unit 30 of the heater ECU 3 stops power feeding to the device 1, and the operation of the device 1 stops. The linkage of the pre-crash signal with the stop of the device 1 is achieved by stopping the power feeding to the heater at the same time of receiving the pre-crash signal to stop the output of the heating portions 11 as illustrated in a time chart of FIG. 17.

A seatbelt lock mechanism 720 is configured to lock pull-out of a seatbelt of the seat, and performs the operation of locking the pull-out of the seatbelt when the vehicle is subject to a predetermined deceleration. The seatbelt lock ECU 72 is a control device that controls the operation of the seatbelt lock mechanism 720. Upon receiving the collision detection signal from the G sensor 700, the seatbelt lock ECU 72 outputs the collision detection signal corresponding to the collision of the vehicle to the heater ECU 3. The output control unit 30 of the heater ECU 3 stops power feeding to the device 1, and the operation of the device 1 stops.

According to the radiant heater device 1 of the second embodiment, when receiving the signal indicating that the vehicle has collided or is likely to collide, the output control unit 30 prohibits the power feeding to the heating portions 11. According to the above configuration, since the operation of the radiant heater device 1 stops at the time point when the vehicle has collided or is predicted to collide, a problem that can occur by continuing the operation can be avoided in advance.

Third Embodiment

Figure 18:
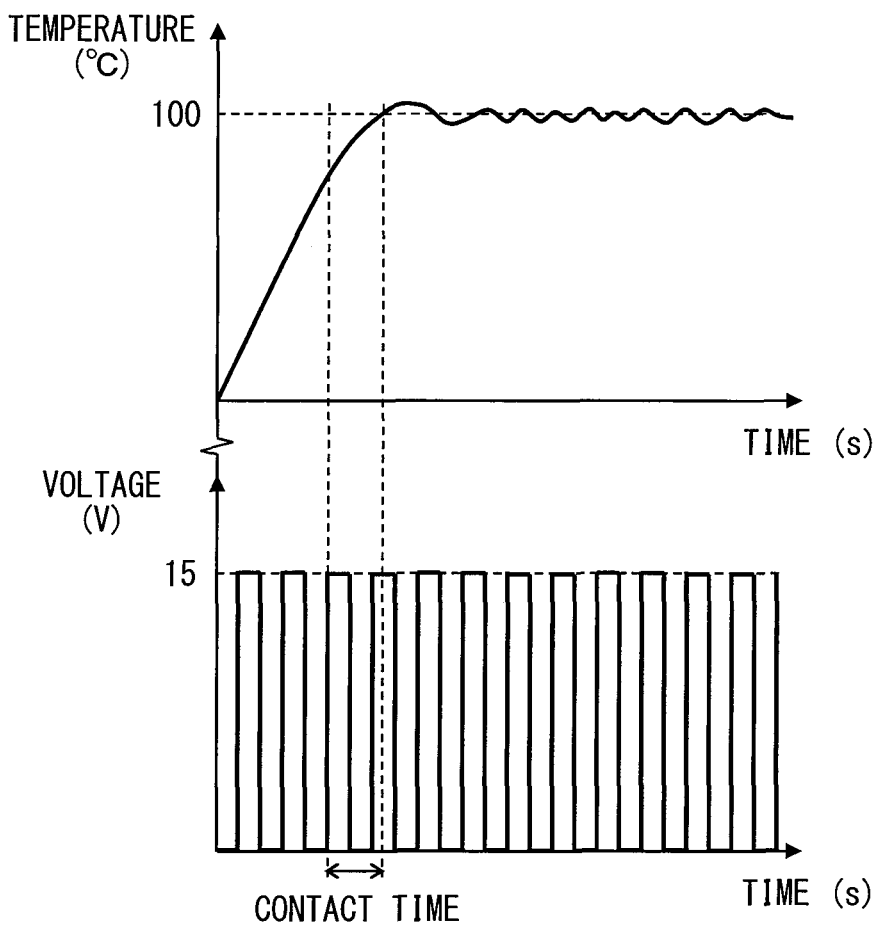
FIG. 18 is a time chart illustrating a control of voltage to be applied to a radiant heater device according to a third embodiment.

A third embodiment will be described with reference to FIG. 18. The third embodiment relates to a control of a voltage to be applied to a device 1.

An output control unit 30 of a heater ECU 3 according to the third embodiment controls the energization of heating portion 11 under a pulse width modulation control (PWM control) for changing a ratio of a time to apply a voltage to the heating portion 11 and a time not to apply the voltage to the heating portion 11.

According to the above configuration, when an object such as a person comes in contact with a front surface layer 101, a time during which a voltage is actually applied can be reduced as compared with a contact time of the object. In other words, the heating portions 11 are energized for only an application time of 15V illustrated in FIG. 18 in a contact time of the object. Therefore, according to the above control, the amount of heat entering the object from the heating portions 11 through the front surface layer 101 can be suppressed, and a temperature rise of the contact portion of the person and the front surface layer 101 can be suppressed.

Fourth Embodiment

A fourth embodiment will be described with reference to FIGS. 19 and 20. In the fourth embodiment, components denoted by the same symbols as those in the drawings according to the first embodiment and configurations not described are identical with those in the first embodiment, and the same advantages are obtained.

An output control unit 30 of a heater ECU 3 according to the fourth embodiment executes a process of prohibiting the energization of heating portion 11 when determining that a level of a battery 4 mounted in a vehicle is low. Therefore, the output control unit 30 stops the operation of a device 1 when the above condition is established.

Figure 19:
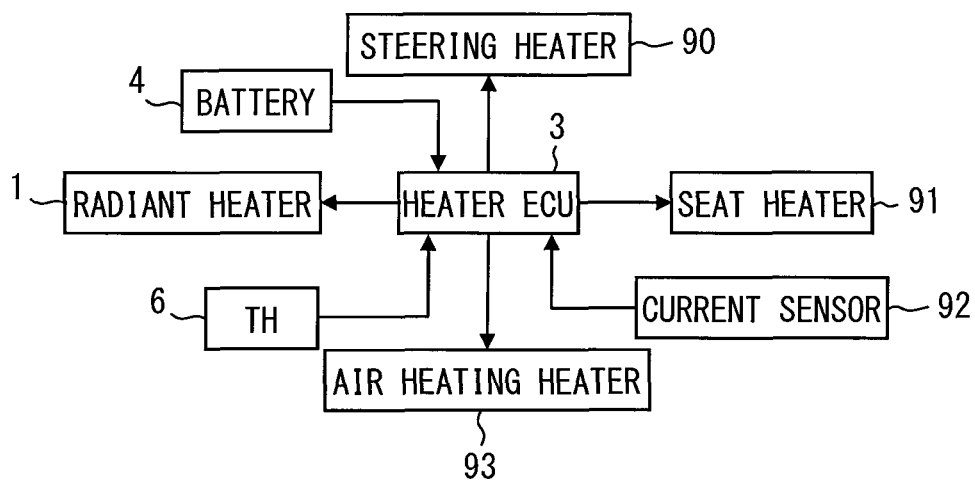
FIG. 19 is a block diagram illustrating a radiant heater device according to a fourth embodiment.

As illustrated in FIG. 19, a heating system 2 includes the radiant heater device 1, a steering heater 90 for warming a steering, a seat heater 91 for warming the seat, and an air heating heater 93 for warming air blown into a vehicle interior. The radiant heater device 1, the steering heater 90, the seat heater 91, and the air heating heater 93 are configured to operate with an electric power supplied from the battery 4 as an operating power. The heater ECU 3 receives a detection signal of a current sensor 92 for detecting a total value of currents supplied to various heaters.

Figure 20:
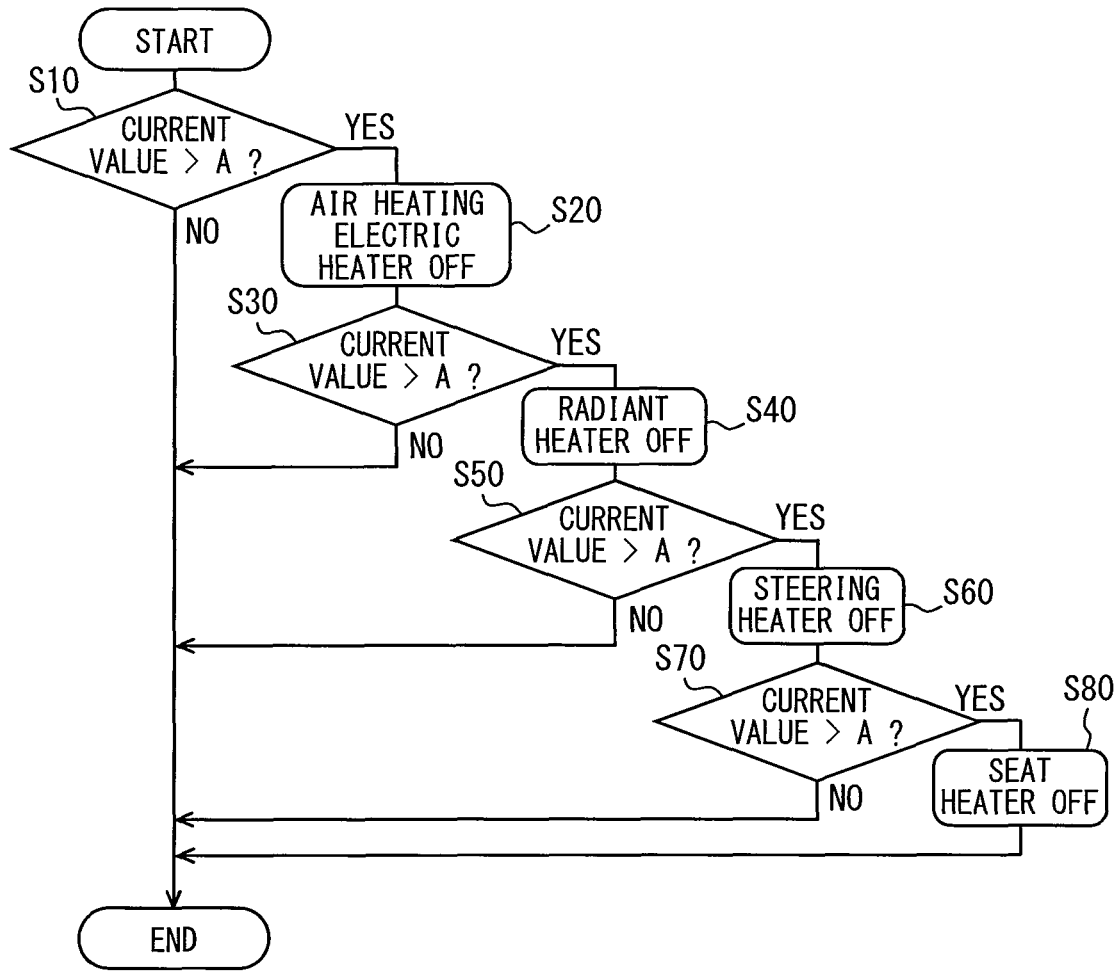
FIG. 20 is a flowchart illustrating operation control involved in various heater devices in a heating equipment according to the fourth embodiment.

The heater ECU 3 controls the operation of the various heaters according to a flowchart illustrated in FIG. 20. The heater ECU 3 first determines whether a detection value of the current sensor 92 exceeds a predetermined current value, or not, in S10, in a state where the various heaters operate. The predetermined current value is a value preset on the basis of an electric power that can be fed to the various heaters by the vehicle. When the detection value exceeds the predetermined current value, the heater ECU 3 determines that the power cannot be fed from the battery 4, or is hardly fed from the battery 4.

When the determination is NO in S10, because the level of the battery 4 is sufficient, the flowchart is completed with no need to stop the various heaters. When the determination is YES in S10, because the level of the battery 4 is low with respect to the supply power, the power supply to the air heating heater 93 stops, and the operation of the air heating heater 93 stops in S20.

Further, the heater ECU 3 determines whether the detection value of the current sensor 92 exceeds a predetermined current value, or not, in S30. When the determination is NO in S30, because the level of the battery 4 is sufficient, there is no need to stop the heater any longer, and the flowchart is completed. When the determination is YES in S30, because the level of the battery 4 is low with respect to the supply power, the power supply to the radiant heater device 1 stops, and the operation of the device 1 stops in S40.

Further, it is determined whether the detection value of the current sensor 92 exceeds a predetermined current value, or not, in S50. When the determination is NO in S50, because the level of the battery 4 is sufficient, there is no need to stop the heater any longer, and the flowchart is completed. When the determination is YES in S50, because the level of the battery 4 is low with respect to the supply power, the power supply to the steering heater 90 stops, and the operation of the steering heater 90 stops in S60.

Further, it is determined whether the detection value of the current sensor 92 exceeds a predetermined current value, or not, in S70. When the determination is NO in S70, because the level of the battery 4 is sufficient, there is no need to stop the heater any longer, and the flowchart is completed. When the determination is YES in S70, because the level of the battery 4 is low with respect to the supply power, the power supply to the seat heater 91 stops, and the operation of the seat heater 91 stops in S80.

According to the radiant heater device 1 of the fourth embodiment, the output control unit 30 prohibits the energization of the heating portion 11 when determining that the level of the battery 4 mounted in the vehicle is low. According to the above configuration, the heating feeling can be provided to the occupant 21 in a power feedable range, and the feedable power of the battery 4 mounted in the vehicle can be prevented from being used up. In particular, in the case of providing multiple electric heaters, when it is determined that the level of the battery 4 is low, the power feeding to the respective heaters can sequentially stop in the order of the power consumption of the heaters on the basis of a predetermined priority. Accordingly, in the heating system 2, the feedable power of the battery 4 mounted in the vehicle is prevented from being used up, and the occupant 21 can obtain predetermined heating feeling.

Fifth Embodiment

A fifth embodiment will be described with reference to FIGS. 21 and 22. In the fifth embodiment, components denoted by the same symbols as those in the drawings according to the first embodiment and configurations not described are identical with those in the first embodiment, and the same advantages are obtained.

When an output control unit 30 of a heater ECU 3 according to the fifth embodiment determines that a temperature of a device 1 is not normal, the output control unit 30 stops the energization of heating portions 11.

Figure 21:
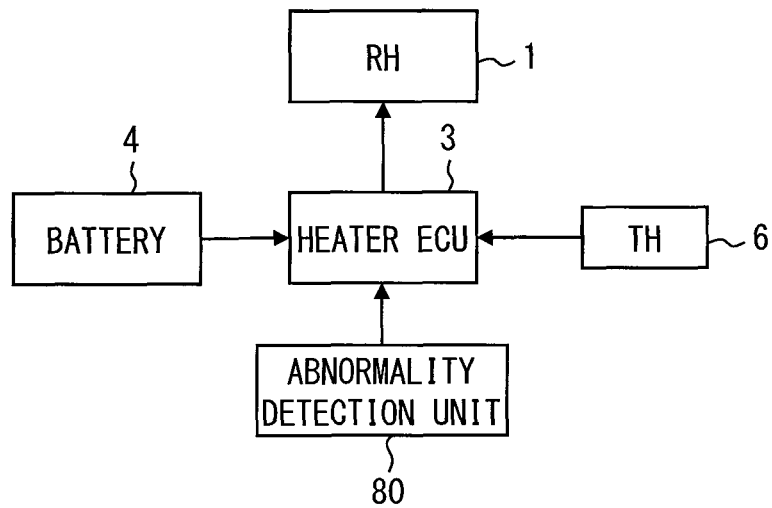
FIG. 21 is a block diagram illustrating a radiant heater device according to a fifth embodiment.

As illustrated in FIG. 21, the heater ECU 3 is configured to receive a detection signal from an abnormality detection unit 80. The abnormality detection unit 80 can employ various detection units. For example, the abnormality detection unit 80 can employ an abnormality temperature detection unit that detects that a heater temperature such as the temperature of the heating portion 11 or the temperature of a front surface layer 101 exceeds a predetermined upper limit temperature, or detects that the heater temperature rapidly changes.

The abnormality detection unit 80 may detect an open/close state of doors or windows of the vehicle. When the abnormality detection unit 80 detects an open state, it is determined that an abnormality signal is detected and the energization of the heating portion 11 is stopped. The abnormality detection unit 80 may determine that the abnormality signal is detected when detecting that an umbrella is carried into the vehicle interior by an image of a camera mounted in the vehicle, and stop the energization of the heating portion 11. The abnormality detection unit 80 may determine that the abnormality signal is detected when detecting that a foreign matter adheres to the front surface layer 101 by the image of the camera mounted in the vehicle, and stop the energization of the heating portion 11. The abnormality detection unit 80 may determine that the abnormality signal is detected when detecting that a pet, an animal, or an infant is present in the vehicle interior by the image of the camera mounted in the vehicle, and stop the energization of the heating portion 11. The abnormality detection unit 80 may determine that the abnormality signal is detected when detecting that the sensors for detecting the front surface layer 101 or the heater temperature are wet by a sensor that can detect that the device 1 is wet, and stop the energization of the heating portion 11.

In the case where the heater temperature does not rise when the power is fed to the device 1, the abnormality detection unit 80 may determine that the abnormality signal is detected, and stop the energization of the heating portion 11. When a state in which the heater temperature is largely different from a target temperature is continued for a predetermined time while the power is fed to the device 1, the abnormality detection unit 80 may determine that the abnormality signal is detected, and stop the energization of the heating portion 11. In the case where the heater temperature cannot be detected at all while the power is fed to the device 1, the abnormality detection unit 80 may determine that the abnormality signal is detected, and stop the energization of the heating portion 11. As those cases, a case in which the sensor for detecting the heater temperature is deviated from a detection position, a case in which a detection unit of the sensor is broken down, or wiring is disconnected, or a case in which a temperature detector circuit is broken down can be assumed. In those cases, a failure of the device 1 caused by disabling an appropriate control of the heating portion 11 can be suppressed by stopping the operation of the device 1. According to the failure detection described above, when the heating portions 11 are configured by an assembly of multiple components, a failure of a partial system among multiple systems can be detected.

Figure 22:
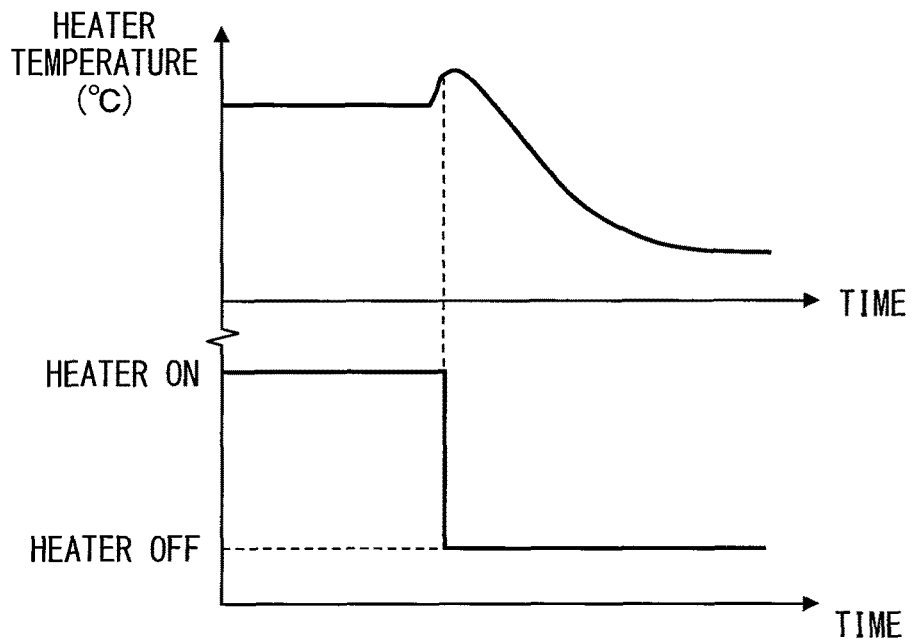
FIG. 22 is a time chart illustrating a relationship between abnormality detection and heater operation in the radiant heater device according to the fifth embodiment.

As an abnormality detection, a time chart illustrated in FIG. 22 shows a relationship between an abnormality detection in the heater temperature and the operation of the device 1. A linkage of the abnormality detection with the stop of the device 1 is achieved by detecting that the heater temperature exceeds the predetermined upper limit, or the heater temperature rapidly changes, and simultaneously stopping the energization of the device 1 to stop the output of the heating portion 11.

According to the radiant heater device 1 of the fifth embodiment, when it is determined that the temperature of the device 1 is not normal, the output control unit 30 stops the energization of the heating portion 11. According to the above configuration, when an unintentional behavior of the heater occurs, the energization of the heater stops, and the device 1 can be prevented from continuing the operation.

Sixth Embodiment

A sixth embodiment will be described with reference to FIGS. 23 to 24. In the sixth embodiment, components denoted by the same symbols as those in the drawings according to the first embodiment and configurations not described are identical with those in the first embodiment, and the same advantages are obtained.

An output control unit 30 of a heater ECU 3 according to the sixth embodiment stops the energization of heating portion 11 when a preset timer time elapses after the energization of a device 1 starts. The output control unit 30 may control the energization of the heating portion 11 to be suppressed and reduced when the preset timer time elapses after the energization of the device 1 starts.

Figure 23:
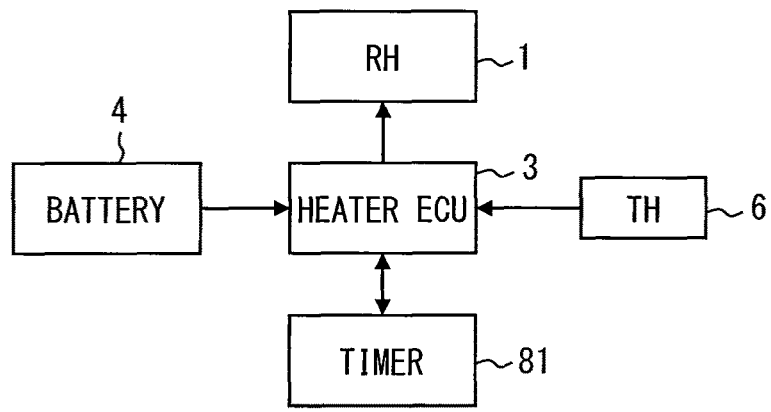
FIG. 23 is a block diagram illustrating a radiant heater device according to a sixth embodiment.

As illustrated in FIG. 23, the heater ECU 3 is configured to receive a signal from a timer device 81. When the timer device 81 receives a signal for starting the energization of the device 1 from the heater ECU 3, the timer device 81 starts a predetermined timer function and starts the count. When the predetermined timer time elapses, the timer device 81 transmits a signal indicative of that fact to the heater ECU 3. Upon receiving the signal, the heater ECU 3 suppresses or stops the energization of the heating portion 11, and terminates the operation of the device 1.

Figure 24:
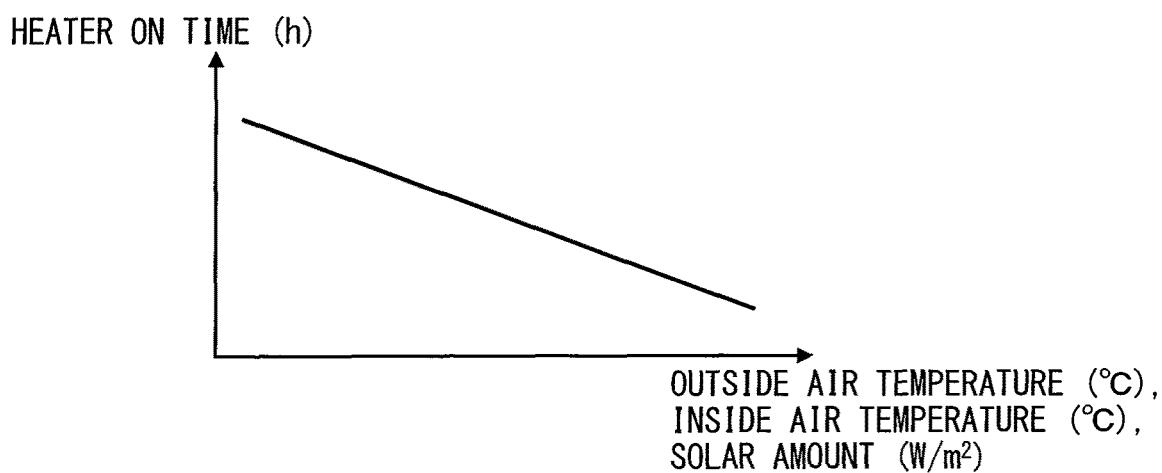
FIG. 24 is a control characteristic graph illustrating a relationship between an inside air temperature etc. and a heater operation time in the radiant heater device according to the sixth embodiment.

An energization duration (predetermined timer time) of the heater can be determined depending on at least one of an outside air temperature, an inside air temperature, and the amount of solar radiation according to predetermined control characteristic data illustrated in FIG. 24. Control characteristic data of the energization duration illustrated in FIG. 24 is stored in a storage unit 33 in advance. The energization duration is determined to be reduced more as the outside air temperature, the inside air temperature, and the amount of solar radiation increase more. For example, the energization duration, and the outside air temperature, the inside air temperature, or the amount of solar radiation are set to establish a relationship of a linear expression.

Figure 25:
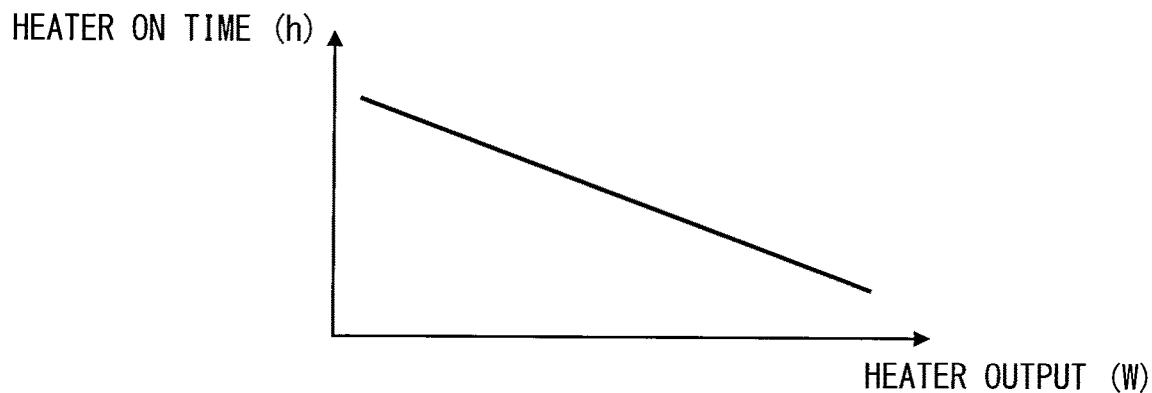
FIG. 25 is a control characteristic graph illustrating a relationship between a heater output and a heater operation time in the radiant heater device according to the sixth embodiment.

As illustrated in FIG. 25, the energization duration (predetermined timer time) of the heater can be determined depending on the output of the heater. The energization duration illustrated in FIG. 25 is determined to be reduced more as the output of the heater increases more.

The predetermined timer time may be set as control characteristic data that changes depending on the inside air temperature, and the control characteristic data may be stored in the storage unit 33 in advance.

According to the radiant heater device 1 of the sixth embodiment, an operating time of the heater is regulated by a timer function with the results that a problem caused by continuing to operate the heater indefinitely can be prevented. For example, a state in which the object continues to contact with a front surface layer 101 is continued indefinitely.

Seventh Embodiment

Figure 26:
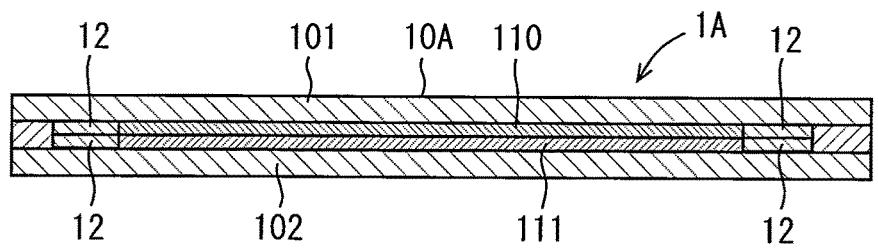
FIG. 26 is a cross-sectional view of a radiant heater device according to a seventh embodiment.
Figure 27:
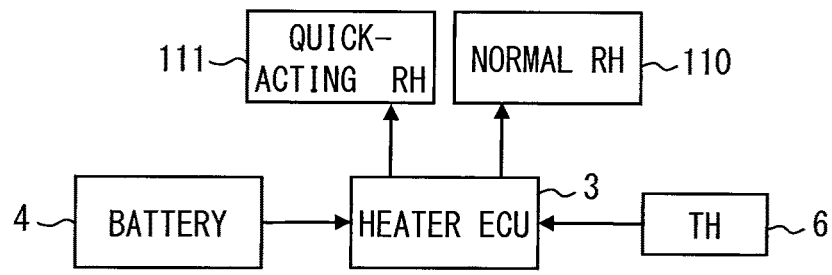
FIG. 27 is a block diagram illustrating the radiant heater device according to the seventh embodiment.

A seventh embodiment will be described with reference to FIGS. 26 and 27. In the seventh embodiment, components denoted by the same symbols as those in the drawings according to the first embodiment and configurations not described are identical with those in the first embodiment, and the same advantages are obtained.

A device 1A according to the seventh embodiment includes a quick-acting heating unit 111 and a normal heating unit 110 as a heating unit. The quick-acting heating unit 111 and the normal heating unit 110 are disposed to overlap with each other in a thickness direction in a substrate portion 10A. An electric power is supplied from a battery 4 to the quick-acting heating unit 111 and the normal heating unit 110, independently. The quick-acting heating unit 111 is set to be smaller in heater resistance than the normal heating unit 110. Therefore, when receiving the same voltage or current, the quick-acting heating unit 111 generates heat more than the normal heating unit 110. As described above, the device 1A includes multiple heating units different in the amount of heat generation.

An output control unit 30 of a heater ECU 3 according to the seventh embodiment can operate and stop the quick-acting heating unit 111 and the normal heating unit 110 depending on a situation, separately. For example, the output control unit 30 can execute the energization of the quick-acting heating unit 111 when ensuring the heating capacity of an immediate effect, and can execute the energization of the normal heating unit 110 when maintaining a constant heating capacity. The switching of the energization may be performed by operating the driving operation unit by an occupant 21, or performed during automatic operation by the heater ECU 3.

Eighth Embodiment

Figure 28:
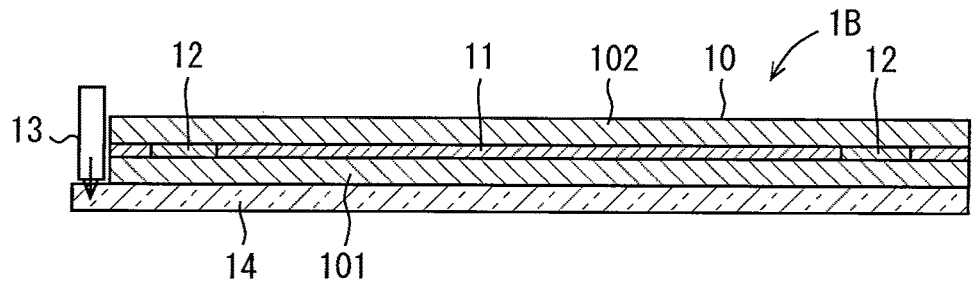
FIG. 28 is a cross-sectional view of a radiant heater device according to an eighth embodiment.
Figure 29:
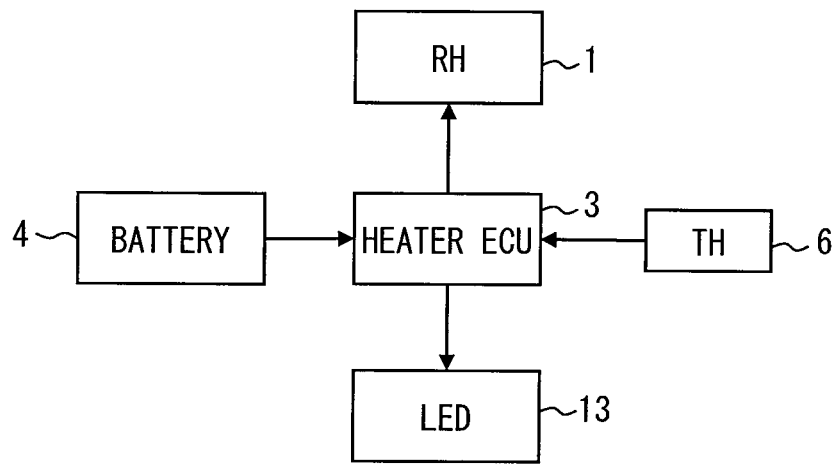
FIG. 29 is a block diagram illustrating the radiant heater device according to the eighth embodiment.

An eighth embodiment will be described with reference to FIGS. 28 and 29. In the eighth embodiment, components denoted by the same symbols as those in the drawings according to the first embodiment and configurations not described are identical with those in the first embodiment, and the same advantages are obtained.

A device 1B according to the eighth embodiment includes a transmission layer 14 overlapping with a front surface layer 101 at a position facing an occupant 21, and an LED 13 that functions as a light projection unit which irradiates the transmission layer 14 with a light beam. The transmission layer 14 is made of a material that can transmit a light of a predetermined wavelength generated by the LED 13. Therefore, an output control unit 30 of a heater ECU 3 controls the LED 13 to emit the light during the energization of heating portion 11. When the transmission layer 14 is irradiated with the light generated by the LED 13, the overall transmission layer 14 is lighted. With the above configuration, when the heating portion 11 is energized, because the front surface layer 101 and the heating portion 11 emit the light, the occupant 21 can recognize that radiant heat is generated during the operation of the device 1B.

Ninth Embodiment

Figure 30:
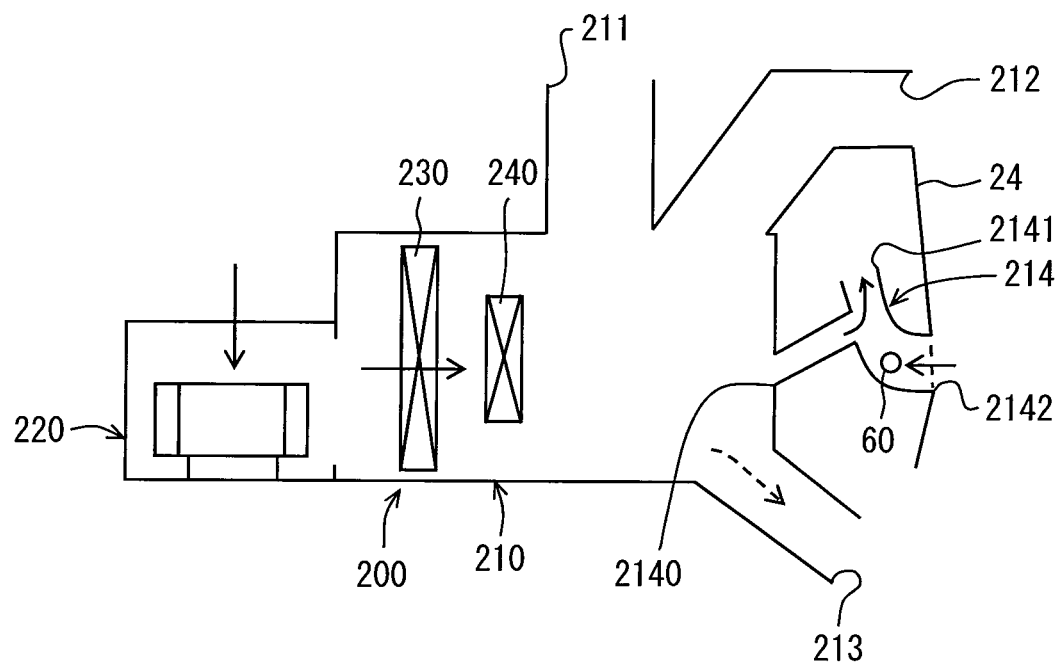
FIG. 30 is a schematic view illustrating an air conditioning apparatus for a vehicle, which has an inside air temperature sensor in ninth to fourteenth embodiments.

A ninth embodiment will be described with reference to FIGS. 30 to 32. In the ninth embodiment, components denoted by the same symbols as those in the drawings according to the above-mentioned embodiments and configurations not particularly described are identical with those in the above-mentioned embodiments, and the same advantages are obtained.

A device 1 acquires an inside air temperature (vehicle interior air temperature) detected by an inside air temperature sensor 60 for air conditioning provided in an air conditioning apparatus 200 for a vehicle, and calculates a heat load on the basis of the acquired inside air temperature. As illustrated in FIG. 30, the air conditioning apparatus 200 includes an air conditioning case that guides a conditioned air to an outlet opened in a predetermined location within a vehicle interior, and a duct connected to the air conditioning case. The air conditioning apparatus 200 includes a blowing unit 220, and an air conditioning unit 210 that regulates a temperature of the air blown from the blowing unit 220.

The blowing unit 220 includes an inside/outside air switching device that adopts at least one of a vehicle interior air and a vehicle exterior air, and a blowing portion that draws in an inside air and an outside air. The inside/outside air switching device includes an inside/outside air switching door, switches an open or close state of an air inlet to another according to a position of the inside/outside air switching door, and takes in the outside air, the inside air, or both of those airs from the opened air inlet by the aid of a suction force of a blowing device. The blowing portion has a fan having, for example, a centrifugal multi-blade fan. The fan is disposed in a spiral scroll casing, and rotates by a driving force of a motor. The air drawn by rotation of the fan reaches a heat exchanging unit of an evaporator 230 through an air passage in the air conditioning case.

The air conditioning unit includes the evaporator 230, a heater core 240, and an air mix door in the air conditioning case. The evaporator 230 is formed in a thin shape, and disposed to cross an air passage in the air conditioning case in a longitudinal direction of the vehicle. With the above configuration, the blast air blown out of the blowing unit 220 flows into a front surface of the heat exchanging unit of the evaporator 230. The evaporator 230 is a cooling heat exchanger that absorbs a latent heat of evaporation of a refrigerant in a refrigeration cycle from a passing air, and cools the air flowing in the air passage.

The heater core 240 is disposed on a downstream of the evaporator 230 at a predetermined interval in the air flow. The heater core 240 is a heating heat exchanger structured to heat the air that has passed through the evaporator 230, and to allow a hot water of a high temperature (for example, engine coolant) to flow therein, and heats the air with the hot water as a heat source. The heat exchanging unit of the heater core 240 is disposed to overlap with a half space of the evaporator 230 on the downstream, and partially crosses a passage downstream of the evaporator 230.

An air mix door not shown is disposed in a passage between the evaporator 230 and the heater core 240. The air mix door is a door that divides the air that has passed through the evaporator 230 into an air to be heated by the heater core 240 and an air to be not heated which bypasses the heater core 240, and regulates a rate of air volume of those airs.

An air mix passage in which a cold air flowing out of the evaporator 230 and a hot air heated by the heater core 240 are merged and mixed together is disposed on a downstream side of the heater core 240 within the air conditioning case. The conditioned air regulated in temperature through the air mix passage can be guided into a defroster blowing opening 211, a face blowing opening 212, and a foot blowing opening 213, which are opened in the vehicle interior.

The defroster blowing opening 211 communicates with an air blowing port in the vehicle interior which is opened toward a windshield through a duct. The face blowing opening 212 communicates with an air blowing port in the vehicle interior, which is opened toward an upper body of an occupant through a duct. The foot blowing opening 213 communicates with an air blowing port in the vehicle interior, which is opened toward feet of the occupant through a duct. A passage that communicates with the respective blowing openings is opened and closed by a blowing door to select any blowing mode for blowing the air conditioning wind into the vehicle interior.

An air conditioning ECU 100 is a control device for controlling the operation of the air conditioning apparatus 200. The air conditioning ECU 100 controls an air intake mode and a blowing mode according to an instruction made by manual operation or a set temperature of automatic operation. The air conditioning ECU 100 sets the air intake mode to any one of an outside air mode, an inside air mode, and an inside/outside air introduction mode. The air conditioning ECU 100 also controls the position of the blowing door, and sets the blowing mode to any one of a foot blowing mode, a face blowing mode, a bi-level mode, a defroster blowing mode, and a foot defroster mode. The air conditioning ECU 100 controls a blowing rate made by the blowing portion and a temperature of the conditioned air according to an instruction made by manual operation or a set temperature of automatic operation.

The air conditioning apparatus 200 includes the inside air temperature sensor 60 that detects the air temperature in the vehicle interior. The temperature detected by the inside air temperature sensor 60 is input to the air conditioning ECU 100, and used as an important parameter in determining an air conditioning output in the air conditioning operation. The inside air temperature sensor 60 is one of the existing detection units 6 provided in the air conditioning apparatus 200.

The inside air temperature sensor 60 is installed inside of an aspirator hose 214 connected to the air conditioning case. The aspirator hose 214 defines a passage that communicates the air mix passage within the air conditioning case with the vehicle interior. The aspirator hose 214 connects a vehicle interior side opening 2142 opened in the vehicle interior to a case side opening 2140 opened in the air mix passage. Further, the aspirator hose 214 has a discharge opening 2141 opened between the vehicle interior side opening 2142 and the case side opening 2140. The discharge opening 2141 functions as a vent that is opened in a space defined by a rear of an instrument panel 24. The air taken in the interior of the aspirator hose 214 from the vehicle interior side opening 2142 or the case side opening 2140 is discharged from the vent.

As described above, the air conditioning apparatus 200 is installed in the space defined by the rear of the instrument panel 24 in the vehicle interior. Therefore, the inside air temperature sensor 60 is located on the rear of the instrument panel 24. The air in the vehicle interior comes into contact with and passes through the inside air temperature sensor 60, and is discharged from the discharge opening 2141 toward the rear of the instrument panel 24.

When the blowing portion of the air conditioning apparatus 200 blows the air, a part of the air in the air conditioning case flows into the aspirator hose 214 from the vehicle interior side opening 2142, and is discharged from the discharge opening 2141 defined in the middle of the aspirator hose 214. The air in the vehicle interior is drawn into the aspirator hose 214 from the vehicle interior side opening 2142 in association with the air discharged from the discharge opening 2141. The air in the vehicle interior is drawn into the aspirator hose 214, and then discharged from the discharge opening 2141. The air comes in contact with the inside air temperature sensor 60 installed in the middle of the aspirator hose 214. In this situation, the inside air temperature sensor 60 can detect the air temperature (inside air temperature) in the vehicle interior.

Even when the air is not blown from the blowing portion, the inside air temperature sensor 60 is disposed at a position close to the vehicle interior with the results that the temperature detected by the inside air temperature sensor 60 can be employed as the air temperature in the vehicle interior.

Figure 31:
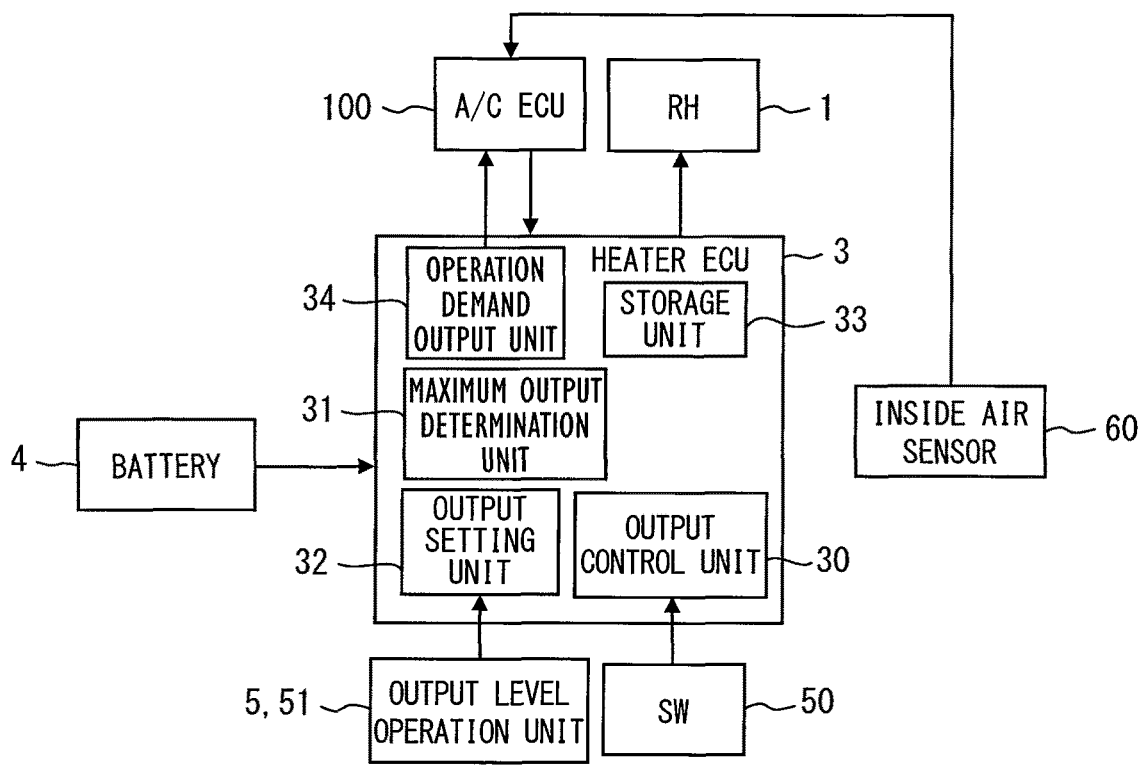
FIG. 31 is a block diagram illustrating a radiant heater device according to the ninth to fourteenth embodiments.

Information on the inside air temperature detected by the inside air temperature sensor 60 is input to the air conditioning ECU 100 as an electric signal, as illustrated in FIG. 31. The air conditioning ECU 100 outputs the information on the inside air temperature input by the inside air temperature sensor 60 to an output control unit 30 of a heater ECU 3.

Figure 32:
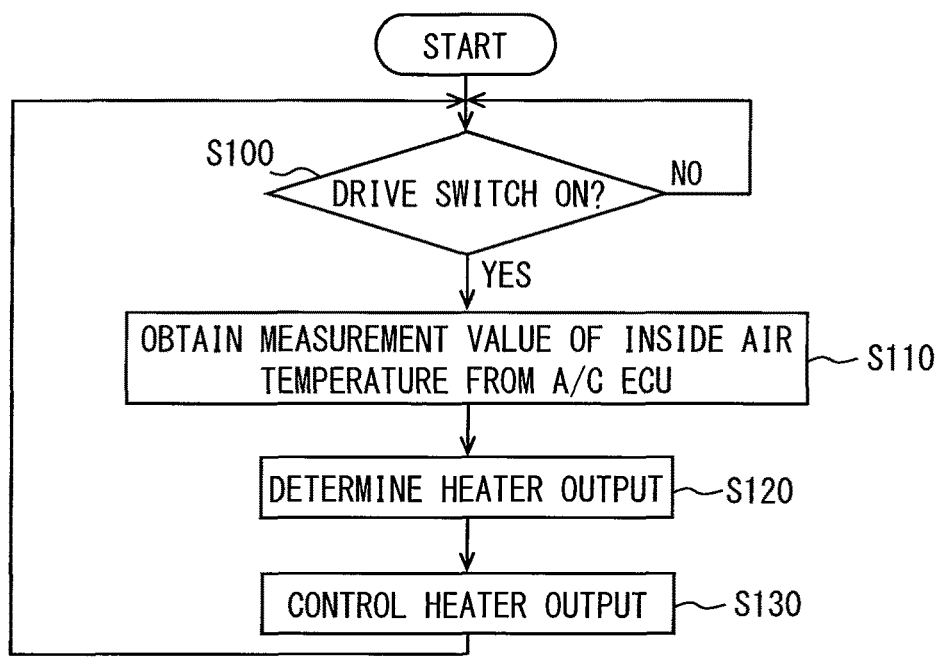
FIG. 32 is a flowchart illustrating operation control of a heating device according to the ninth embodiment.

The heater ECU 3 executes a heater output control according to a flowchart of FIG. 32. The flowchart starts when an ignition switch or a start switch of the vehicle turns on. When the ignition switch or the start switch turns on, the air conditioning ECU 100 also becomes in a ready state. When the air conditioning ECU 100 starts, the air conditioning apparatus 200 can be set to start automatic air conditioning operation, and temperature detection made by the inside air temperature sensor 60 is enabled.

First, in S100, the heater ECU 3 determines whether an operation instruction of a device 1 has been input by the operation of an on/off switch 50, or not. The determination in S100 is repeated until the operation instruction is input. When it is determined that the operation instruction has been input in S100, a measured value of the inside air temperature by the inside air temperature sensor 60, which has been input to the air conditioning ECU 100, is acquired from the air conditioning ECU 100 in S110.

Then, the output control unit 30 determines the output (heater output) of heating portion 11 so as not to exceed the upper limit of the output of the heating portion 11, depending on the inside air temperature acquired from the air conditioning ECU 100 according to the predetermined control characteristic data described above illustrated in FIG. 7, in S120. In other words, the output control unit 30 controls the output and the temperature of the heater in an output range included in a hatched region in FIG. 7. The output control unit 30 determines the output value and the temperature of the heater which are higher as the inside air temperature is lower, and determines the output value and the temperature of the heater which are lower as the inside air temperature is higher.

In S130, the output control unit 30 controls a voltage value and a current value to be supplied to the heating portion 11 depending on the heater output value determined in S120, and controls the temperature and the amount of heat generation of the heating portion 11. The flowchart again returns to S100, and the above series of processing is repetitively executed.

According to the ninth embodiment, the heater main body is installed in the vehicle interior. The heat load is the amount of heat required for heating which is calculated on the basis of the inside air temperature which is an air temperature in the vehicle interior. The output control unit 30 acquires the inside air temperature detected by the inside air temperature sensor 60 for air conditioning provided in the air conditioning apparatus 200 that performs air conditioning in the vehicle interior, and calculates the heat load on the basis of the acquired inside air temperature.

According to the above configuration, the heat load can be obtained with the use of the inside air temperature sensor 60 normally equipped in the air conditioning apparatus. According to the device 1 of the ninth embodiment, the heater output can be appropriately controlled without specifically equipping parts for obtaining the heat load.

The inside air temperature sensor for detecting the air temperature in the vehicle interior may be installed in the vicinity of the heater main body of the device 1, in the vicinity of the on/off switch 50, or in the vicinity of the heater ECU 3 or the air conditioning ECU 100.

Tenth Embodiment

In a tenth embodiment, a description will be described of a heater output control according to another configuration of the ninth embodiment with reference to FIG. 33. In the tenth embodiment, components and processing denoted by the same symbols as those in the drawings according to the above-mentioned embodiments and configurations not particularly described are identical with those in the above-mentioned embodiments, and the same advantages are obtained. In the tenth embodiment, only portions different from the ninth embodiment will be described below.

Figure 33:
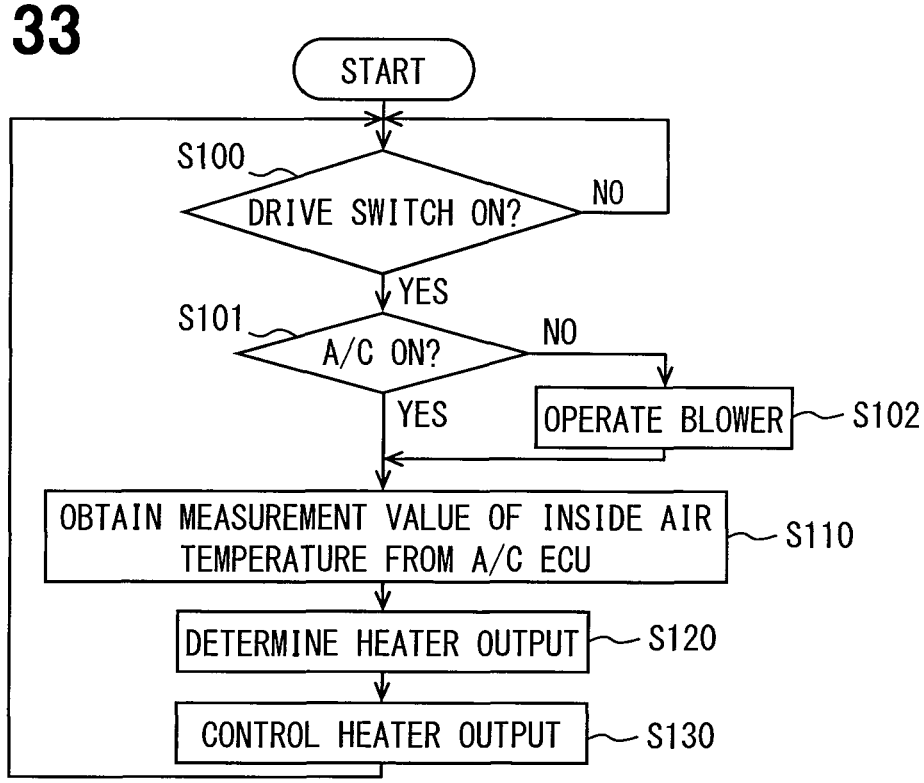
FIG. 33 is a flowchart illustrating operation control of a heating device according to the tenth embodiment.

A heater ECU 3 executes a heater output control according to a flowchart of FIG. 33. When it is determined that an operation instruction has been input in S100, it is then determined whether the operation instruction of an air conditioning apparatus 200 has been input by the operation of an air conditioning switch, or not, in S101.

When it is determined that the operation instruction of the air conditioning apparatus 200 has been input in S101, the flowchart proceeds to S110, and the heater ECU 3 acquires a measured value of an inside air temperature by an inside air temperature sensor 60 from an air conditioning ECU 100. In this situation, because the air conditioning apparatus 200 is in an operating state, automatic air conditioning operation starts to blow the air by the blowing portion. With the above configuration, because a part of the air in an air conditioning case flows into an aspirator hose 214 from a vehicle interior side opening 2142, and is discharged from a discharge opening 2141 defined in the middle of the aspirator hose 214, the air in the vehicle interior is drawn from the vehicle interior side opening 2142 into the aspirator hose 214. In this situation, the inside air temperature sensor 60 can detect the air temperature (inside air temperature) in the vehicle interior.

When it is determined that the operation instruction of the air conditioning apparatus 200 has not been input in S101, the heater ECU 3 outputs an operation request for forcedly operating the blowing portion (blower) to the air conditioning ECU 100 in S102. As in S102, the heater ECU 3 provides an operation demand output unit 34 for outputting a predetermined operation request to the air conditioning apparatus 200.

With the action of the operation demand output unit 34, the air blowing by the blowing portion is performed by the air conditioning ECU 100. The flowchart proceeds to S110, and the heater ECU 3 acquires the measured value of the inside air temperature by the inside air temperature sensor 60 from the air conditioning ECU 100. Subsequently, as with the above processing, S120 and S130 are executed.

According to the tenth embodiment, a device 1 provides the operation demand output unit 34 for outputting a predetermined operation request to the vehicle air conditioning apparatus 200. In the case where the blowing portion does not operate, when the operation instruction for energizing the heating portion 11 is not input to an output control unit 30, the operation demand output unit 34 outputs a request for operating the blowing portion to the air conditioning apparatus 200. Further, after the blowing portion has operated, the inside air temperature sensor 60 detects the inside air temperature, and the output control unit 30 acquires the inside air temperature detected by the inside air temperature sensor 60.

According to the above control, in response to the blowing operation instruction from the operation demand output unit 34 to the air conditioning apparatus 200, the air in the vehicle interior comes in contact with the inside air temperature sensor 60 before the inside air temperature sensor 60 detects the inside air temperature. With the above operation, as described above, the inside air temperature sensor 60 can reliably and accurately detect the air temperature in the vehicle interior. Therefore, the device 1 can obtain an accurate heat load with the use of the inside air temperature sensor 60 normally equipped in the air conditioning apparatus, and can provide an appropriate heating feeling to the occupant.

Eleventh Embodiment

In an eleventh embodiment, a description will be given of a heater output control according to another configuration of the tenth embodiment with reference to FIG. 34. In the eleventh embodiment, components and processing denoted by the same symbols as those in the drawings according to the above-mentioned embodiments and configurations not particularly described are identical with those in the above-mentioned embodiments, and the same advantages are obtained. In the eleventh embodiment, only portions different from the tenth embodiment will be described below.

Figure 34:
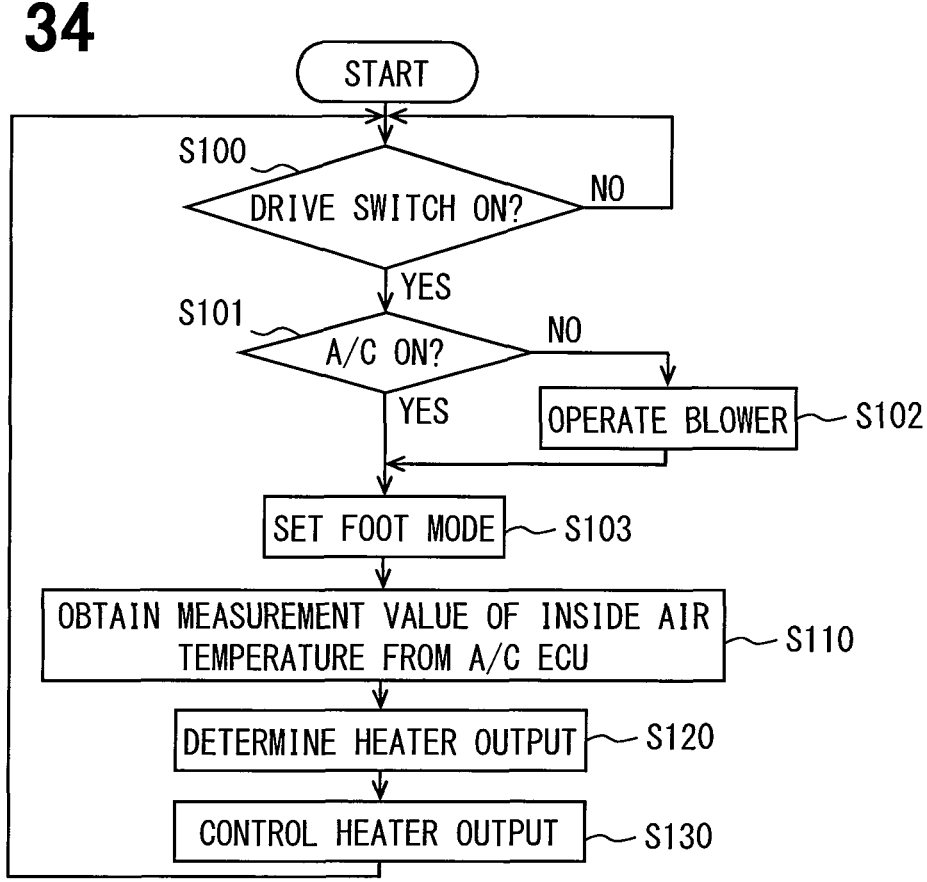
FIG. 34 is a flowchart illustrating operation control of a heating device according to the eleventh embodiment.

A heater ECU 3 executes a heater output control according to a flowchart of FIG. 34. After it is determined that an air conditioning apparatus 200 is in an operating state in S101, or after an operation request of a blowing portion has been performed in S102, a process of S103 is performed.

The heater ECU 3 outputs an operation request for setting a blowing mode to a foot blowing mode to an air conditioning ECU 100 in S103. As in the process of S103, the heater ECU 3 includes an operation demand output unit 34 for outputting a predetermined operation request to the air conditioning apparatus 200.

With the action of the operation demand output unit 34, the foot blowing mode is set by the air conditioning ECU 100, and the air is blown toward feet of an occupant in association with the air blowing made by a blowing portion. In other words, the foot blowing into the vehicle interior is performed, and the blast air is discharged into a discharge opening 2141 from a case side opening 2140 as described above. As a result, the air in the vehicle interior flows into an aspirator hose 214 from a vehicle interior side opening 2142.

Thereafter, the flowchart proceeds to S110, and the heater ECU 3 acquires the measured value of the inside air temperature by an inside air temperature sensor 60 from the air conditioning ECU 100. Subsequently, as with the above processing, S120 and S130 are executed.

According to the eleventh embodiment, the operation of the blowing portion which is requested by the operation demand output unit 34 is performed in a state where the mode of blowing the air into the vehicle interior by the air conditioning apparatus 200 is set to the foot blowing mode.

According to the above control, in response to the blowing operation instruction and the blowing mode operation instruction from the operation demand output unit 34 to the air conditioning apparatus 200, the air in the vehicle interior comes in contact with the inside air temperature sensor 60 before the inside air temperature sensor 60 detects the inside air temperature. With the above control, as described above, the inside air temperature sensor 60 can reliably and accurately detect the air temperature in the vehicle interior, and the foot blowing mode is set at the time of detecting the inside air temperature. Therefore, a device 1 can provide a situation in which the occupant is unlikely to feel the air blowing by the foot air at the time of detecting the inside air temperature, and obtain an accurate heat load with the use of the inside air temperature sensor 60 normally equipped in the air conditioning apparatus, and therefore can provide an appropriate heating feeling to the occupant.

Twelfth Embodiment

In a twelfth embodiment, a description will be given of a heater output control according to another configuration of the tenth embodiment with reference to FIG. 35. In the twelfth embodiment, components and processing denoted by the same symbols as those in the drawings according to the above-mentioned embodiments and configurations not particularly described are identical with those in the above-mentioned embodiments, and the same advantages are obtained. In the twelfth embodiment, only portions different from the tenth embodiment will be described below.

Figure 35:
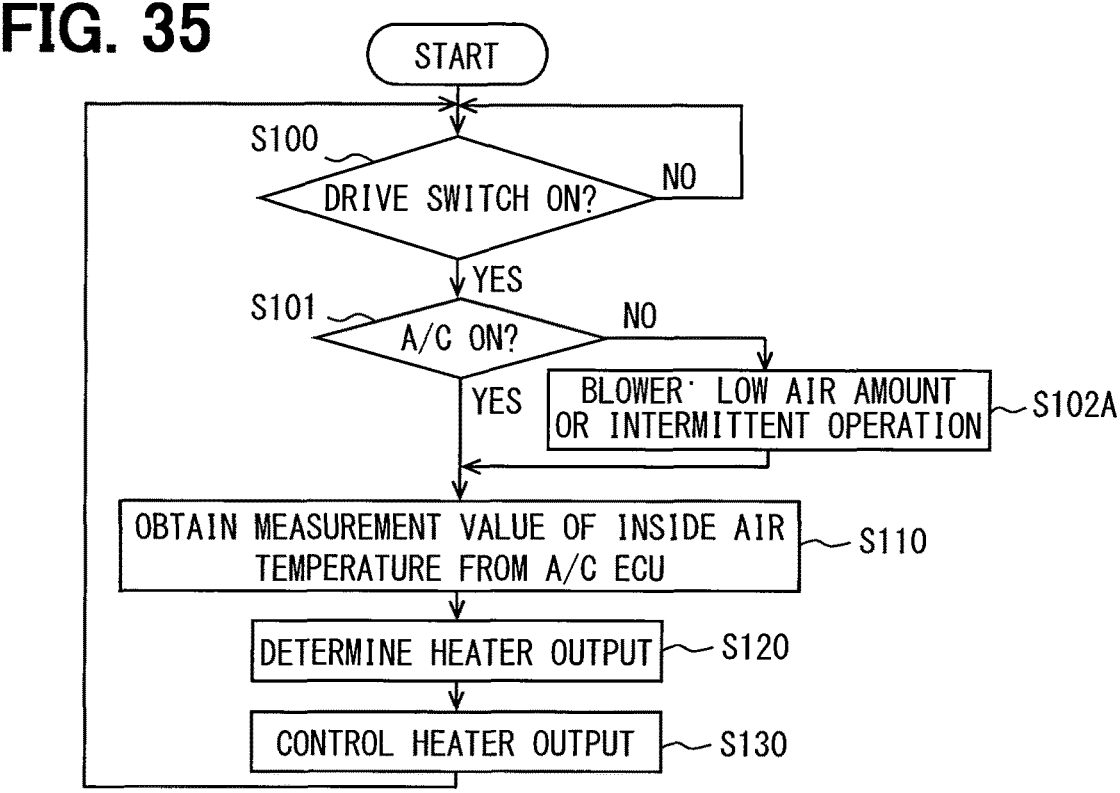
FIG. 35 is a flowchart illustrating operation control of a heating device according to the twelfth embodiment.

A heater ECU 3 executes a heater output control according to a flowchart of FIG. 35. When it is determined that an operation instruction has been input in S100, it is then determined whether the operation instruction of an air conditioning apparatus 200 has been input by the operation of an air conditioning switch, or not, in S101.

When the heater ECU 3 determines that the operation instruction of the air conditioning apparatus 200 has not been input in S101, the heater ECU 3 outputs an operation request for operating a blowing portion (blower) at a low air volume to an air conditioning ECU 100 in S102A. The air volume according to the operation request is smaller than an air volume controlled when automatic air conditioning operation is set. In other words, the air volume according to the operation request is set to be smaller than an air volume set in automatic operation of the vehicle air conditioning apparatus 200 when the same heat load is applied. The air conditioning ECU 100 that receives the above operation request from the heater ECU 3 can control the blowing portion to be at an air volume level, for example, lowest in settable air volume levels.

The heater ECU 3 outputs an operation request for intermittently operating the blowing portion (blower) to the air conditioning ECU 100 in S102A. The required intermittent operation repeats blowing operation of a predetermined short time and stop. The air conditioning ECU 100 that has received the above operation request from the heater ECU 3 controls the blowing portion, and performs the intermittent blowing operation for alternately repeating blowing operation and blowing stop.

As in the process of S102A, the heater ECU 3 includes an operation demand output unit 34 for outputting a predetermined operation request to the air conditioning apparatus 200. With the action of the operation demand output unit 34, the air blowing with a low air volume or in the intermittent operation is performed by the air conditioning ECU 100. The flowchart proceeds to S110, and the heater ECU 3 acquires the measured value of the inside air temperature by the inside air temperature sensor 60 from the air conditioning ECU 100. Subsequently, as with the above processing, S120 and S130 are executed.

According to the twelfth embodiment, the operation of the blowing portion requested by the operation demand output unit 34 is performed at the air volume level lower than the air volume level when the automatic air conditioning operation is set in the air conditioning apparatus 200.

According to the above control, in response to an operation instruction for reduction of the air volume from the operation demand output unit 34 to the air conditioning apparatus 200, the air in the vehicle interior comes in contact with an inside air temperature sensor 60 before the inside air temperature sensor 60 detects the inside air temperature. With the above control, as described above, the inside air temperature sensor 60 can reliably and accurately detect the air temperature in the vehicle interior, and the air blowing at the low air volume is performed at the time of detecting the inside air temperature. Therefore, a device 1 can provide a situation in which the occupant is unlikely to feel the air blowing at the time of detecting the inside air temperature, and obtain an accurate heat load with the use of the inside air temperature sensor 60 normally equipped in the air conditioning apparatus, and therefore can provide an appropriate heating feeling to the occupant.

According to the twelfth embodiment, the operation of the blowing portion requested by the operation demand output unit 34 is an intermittent operation for repeating the blowing operation and the blowing stop.

According to the above control, in response to the intermittent operation instruction from the operation demand output unit 34 to the air conditioning apparatus 200, the air in the vehicle interior comes in contact with the inside air temperature sensor 60 before the inside air temperature sensor 60 detects the inside air temperature. With the above control, as described above, the inside air temperature sensor 60 can reliably and accurately detect the air temperature in the vehicle interior, and the discontinuous air blowing at predetermined intervals is performed at the time of detecting the inside air temperature. Therefore, the device 1 can provide a situation in which the occupant is unlikely to feel the air blowing at the time of detecting the inside air temperature, and obtain an accurate heat load with the use of the inside air temperature sensor 60 normally equipped in the air conditioning apparatus, and therefore can provide an appropriate heating feeling to the occupant.

Thirteenth Embodiment

In a thirteenth embodiment, a description will be given of a heater output control according to another configuration of the tenth embodiment with reference to FIG. 36. In the thirteenth embodiment, components and processing denoted by the same symbols as those in the drawings according to the above-mentioned embodiments and configurations not particularly described are identical with those in the above-mentioned embodiments, and the same advantages are obtained. In the thirteenth embodiment, only portions different from the tenth embodiment will be described below.

Figure 36:
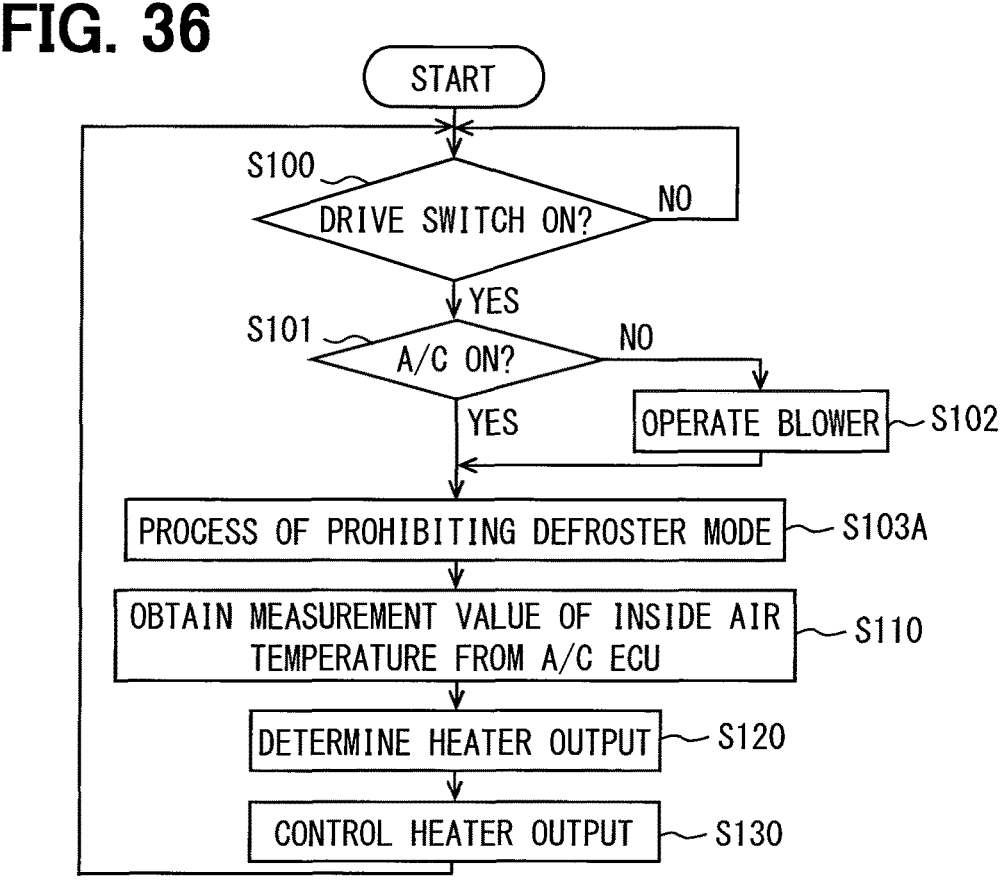
FIG. 36 is a flowchart illustrating operation control of a heating device according to the thirteenth embodiment.

A heater ECU 3 executes a heater output control according to a flowchart of FIG. 36. After it is determined that an air conditioning apparatus 200 is in an operating state in S101, or after an operation request of a blowing portion is performed in S102, a process of S103A is performed.

The heater ECU 3 outputs an operation request for prohibiting a defroster blowing mode to an air conditioning ECU 100 in S103A. As in the process of S103A, the heater ECU 3 includes an operation demand output unit 34 for outputting a predetermined operation request to the air conditioning apparatus 200.

With the action of the operation demand output unit 34, the prohibition of the defroster blowing mode is set by the air conditioning ECU 100, and another blowing mode for prohibiting the air blowing to a windshield is performed in association with the air blowing made by the blowing portion. In other words, the air blowing toward the windshield is not performed, and the blast air is discharged into a discharge opening 2141 from a case side opening 2140 as described above. As a result, the air in the vehicle interior flows into an aspirator hose 214 from a vehicle interior side opening 2142.

Thereafter, the flowchart proceeds to S110, and the heater ECU 3 acquires the measured value of the inside air temperature by an inside air temperature sensor 60 from the air conditioning ECU 100. Subsequently, as with the above processing, S120 and S130 are executed.

According to the thirteenth embodiment, the operation of the blowing portion which is requested by the operation demand output unit 34 is performed in another blowing mode for prohibiting the defroster blowing mode in multiple modes for blowing the air into the vehicle interior by the air conditioning apparatus 200.

According to the above control, in response to the blowing operation instruction and the defroster blowing mode prohibition instruction from the operation demand output unit 34 to the air conditioning apparatus 200, the air in the vehicle interior comes in contact with the inside air temperature sensor 60 before the inside air temperature sensor 60 detects the inside air temperature. With the above control, as described above, the inside air temperature sensor 60 can reliably and accurately detect the air temperature in the vehicle interior, and the defroster blowing mode is not performed at the time of detecting the inside air temperature. Therefore, because a device 1 can suppress the generation of window fogging caused by wet of an evaporator 230, and obtain an accurate heat load with the use of the inside air temperature sensor 60 normally equipped in the air conditioning apparatus, the device 1 can reduce the likelihood of the window fogging and provide an appropriate heating feeling.

In that case, the operation of a compressor also stops so as not to provide the occupant with an uncomfortable feeling caused by operating the compressor of an air conditioning refrigeration cycle. Therefore, the air conditioning apparatus 200 performs only air blowing.

Fourteenth Embodiment

In a fourteenth embodiment, a description will be given of a heater output control according to another configuration of the tenth embodiment with reference to FIG. 37. In the fourteenth embodiment, components and processing denoted by the same symbols as those in the drawings according to the above-mentioned embodiments and configurations not particularly described are identical with those in the above-mentioned embodiments, and the same advantages are obtained. In the fourteenth embodiment, only portions different from the tenth embodiment will be described below.

Figure 37:
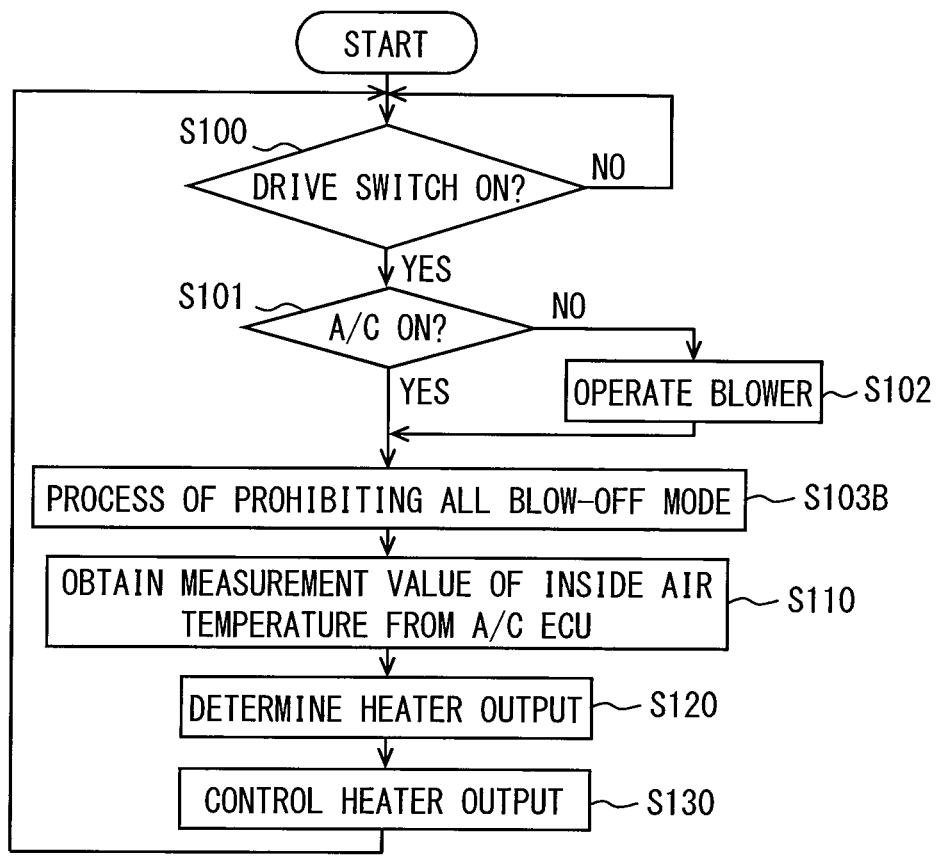
FIG. 37 is a flowchart illustrating operation control of a heating device according to the fourteenth embodiment.

A heater ECU 3 executes a heater output control according to a flowchart of FIG. 37. After it is determined that an air conditioning apparatus 200 is in an operating state in S101, or after an operation request of a blowing portion is performed in S102, a process of S103B is performed.

The heater ECU 3 outputs an operation request for prohibiting all of the blowing modes to an air conditioning ECU 100 in S103B. As in the process of S103B, the heater ECU 3 includes an operation demand output unit 34 for outputting a predetermined operation request to the air conditioning apparatus 200.

With the action of the operation demand output unit 34, the prohibition of all of the blowing modes is set by the air conditioning ECU 100, and the air blowing is not performed from any blowing opening in the vehicle interior in association with the air blowing made by the blowing portion. In other words, the blast air flows into an aspirator hose 214 from only a case side opening 2140, and is discharged from a discharge opening 2141. As a result, the air in the vehicle interior flows into the aspirator hose 214 from a vehicle interior side opening 2142.

Thereafter, the flowchart proceeds to S110, and the heater ECU 3 acquires the measured value of the inside air temperature by an inside air temperature sensor 60 from the air conditioning ECU 100. Subsequently, as with the above processing, S120 and S130 are executed.

According to the fourteenth embodiment, the operation of the blowing portion, which is requested by the operation demand output unit 34, is performed with the prohibition of all of the blowing modes.

According to the above control, in response to the blowing operation instruction and the all blowing mode prohibition instructions from the operation demand output unit 34 to the air conditioning apparatus 200, the air in the vehicle interior comes in contact with the inside air temperature sensor 60 before the inside air temperature sensor 60 detects the inside air temperature. With the above control, as described above, the inside air temperature sensor 60 can reliably and accurately detect the air temperature in the vehicle interior, and the air blowing into the vehicle interior is not performed at the time of detecting the inside air temperature. Therefore, a device 1 can provide a situation in which the occupant does not feel the air blowing at the time of detecting the inside air temperature, and obtain an accurate heat load with the use of the inside air temperature sensor 60 normally equipped in the air conditioning apparatus, and therefore can provide an appropriate heating feeling without an uncomfortable feeling caused by the air blowing to the occupant. Further, because the blown air by the blowing portion flows into only the aspirator hose 214, since the air volume by the blowing portion can be reduced, the effects of a reduction in noise and energy saving are obtained.

In that case, the operation of a compressor also stops so as not to provide the occupant with an uncomfortable feeling caused by operating the compressor of an air conditioning refrigeration cycle. Therefore, the air conditioning apparatus 200 performs only air blowing into the aspirator hose 214.

Fifteenth Embodiment

A fifteenth embodiment will be described with reference to FIGS. 38 to 42. In the fifteenth embodiment, components denoted by the same symbols as those in the drawings according to the above-mentioned embodiments and configurations not particularly described are identical with those in the above-mentioned embodiments, and the same advantages are obtained.

Figure 38:
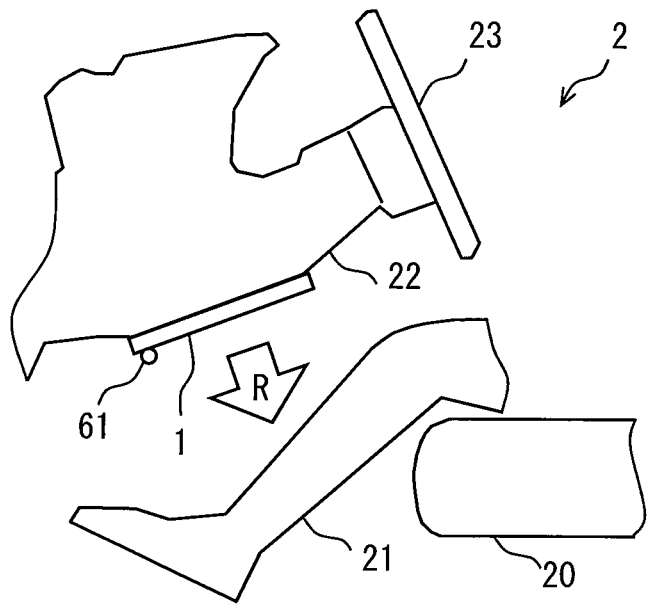
FIG. 38 is a diagram illustrating a positional relationship between a radiant heater device according to a fifteenth embodiment and a sixteenth embodiment and an occupant.
Figure 39:
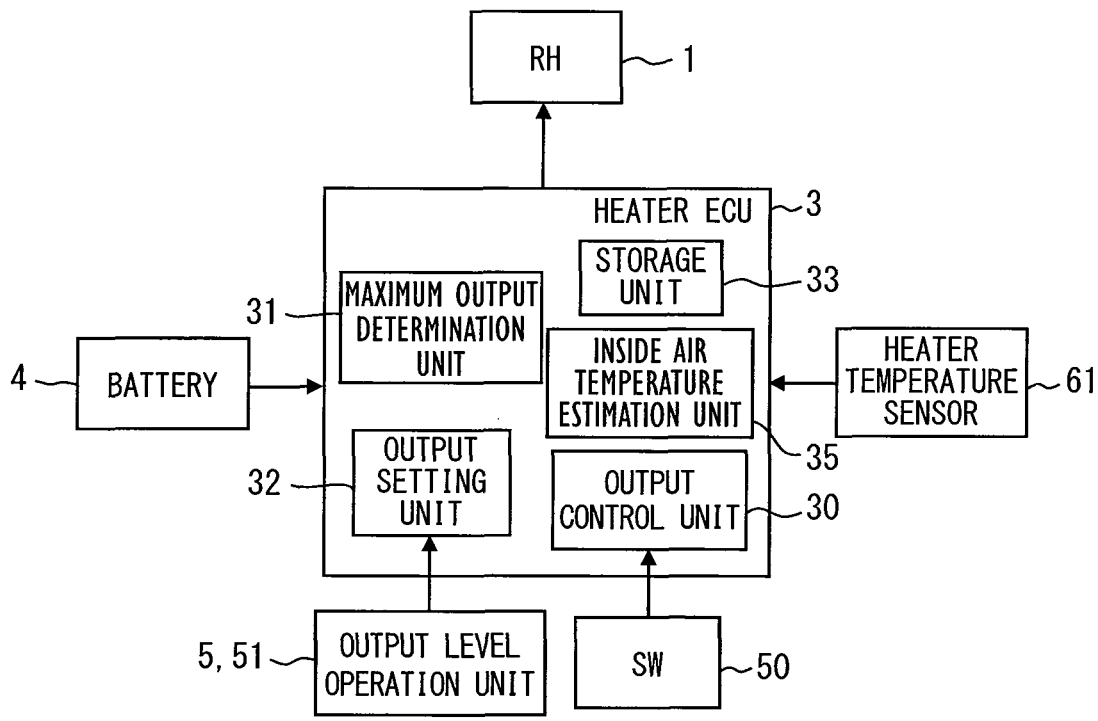
FIG. 39 is a block diagram illustrating the radiant heater device according to the fifteenth and sixteenth embodiments.

A heater ECU 3 in a device 1 according to the fifteenth embodiment includes an inside air temperature estimation unit 35 that estimates an air temperature (inside air temperature) in a vehicle interior. An output control unit 30 calculates a heat load on the basis of an estimated inside air temperature estimated by the inside air temperature estimation unit 35. As illustrated in FIG. 38, a heating system 2 includes a heater temperature sensor 61 (as a heater temperature detection unit) for detecting a temperature of heating portion 11 in the device 1. The heater temperature sensor 61 detects the temperature of the heating portion 11 as an electric signal, and outputs the electric signal to the heater ECU 3. The temperature detected by the heater temperature sensor 61 is used as a parameter when the inside air temperature estimation unit 35 of the heater ECU 3 estimates the inside air temperature.

Figure 41:
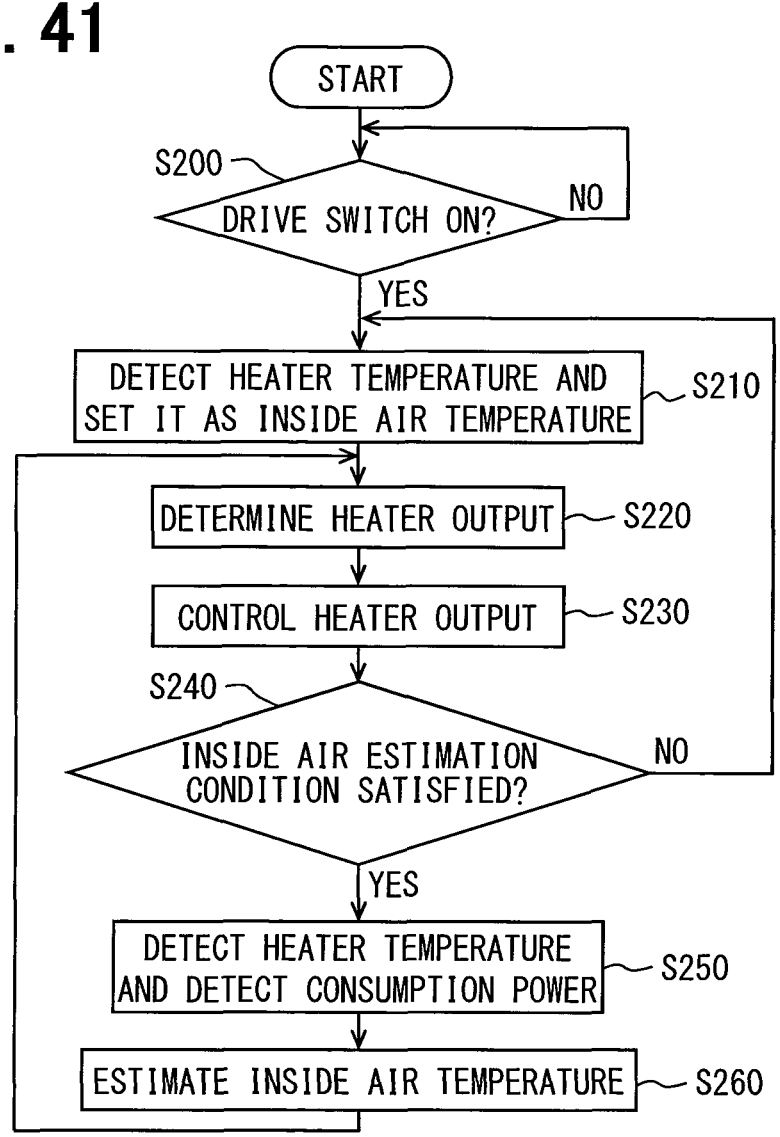
FIG. 41 is a flowchart illustrating operation control of a heating device according to the fifteenth embodiment.

The heater ECU 3 executes a heater output control according to a flowchart of FIG. 41. The flowchart starts when an ignition switch or a start switch of the vehicle turns on. When the ignition switch or the start switch turns on, an air conditioning ECU 100 also becomes in a ready state.

First, in S200, the heater ECU 3 determines whether an operation instruction of the device 1 has been input by the operation of an on/off switch 50, or not. The determination in S200 is repeated until the operation instruction is input. When it is first determined that an operation instruction has been input in S200, the heater ECU 3 sets the heater temperature detected by the heater temperature sensor 61 as an inside air temperature used for calculation of the heat load in S210.

Figure 40:
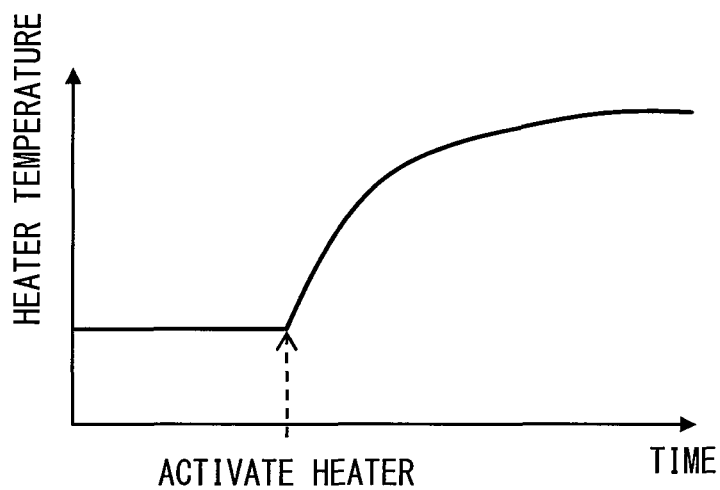
FIG. 40 is a graph illustrating a change in heater temperature in the radiant heater device according to the fifteenth embodiment.

The reason why the detected heater temperature is set as the inside air temperature as in S210 is because it is considerable that the heater temperature is close to the air temperature in the vehicle interior shortly after the device 1 starts as illustrated in FIG. 40. In other words, the reason is because as illustrated in a graph of FIG. 40, an actual heater temperature rises with the energization start of the heating portion 11, but a certain amount of time is required until that temperature is stabilized.

Then, the output control unit 30 determines an output (heater output) of the heating portion 11 so as not to exceed an upper limit of the output of the heating portion 11, depending on the inside air temperature set in the previous S210 according to the predetermined control characteristic data illustrated in FIG. 7 described above, in S220. In other words, the output control unit 30 controls the output and the temperature of the heater in an output range included in a hatched region in FIG. 7. The output control unit 30 determines the output value and the temperature of the heater which are higher as the inside air temperature is lower, and determines the output value and the temperature of the heater which are lower as the inside air temperature is higher.

In S230, the output control unit 30 controls a voltage value and a current value to be supplied to the heating portion 11 depending on the heater output value determined in S220, and controls the temperature and the amount of heat generation of the heating portion 11.

In subsequent S240, it is determined whether conditions of the inside air temperature estimation are established, or not. The conditions of the inside air temperature estimation are predetermined conditions for performing the inside air temperature estimation by the inside air temperature estimation unit 35.

For example, when a predetermined energization time elapses since the energization start of the heating portion 11, the heater ECU 3 determines that the conditions of the inside air temperature estimation are established. The predetermined energization time is determined to a time at which the heater temperature illustrated in FIG. 40 starts to be stabilized, or a time to arrive at a temperature at predetermined rate to an estimated stable temperature. When the heater temperature detected by the heater temperature sensor 61 becomes higher than or equal to a predetermined temperature, the heater ECU 3 may determine that the conditions of the inside air temperature estimation are established.

When it is determined that the conditions of the inside air temperature estimation are not established in S240, the flowchart returns to S210, and the heater ECU 3 sets the heater temperature again detected by the heater temperature sensor 61 as the inside air temperature for calculation of the heat load, and executes S220 and S230 described above.

Figure 42:
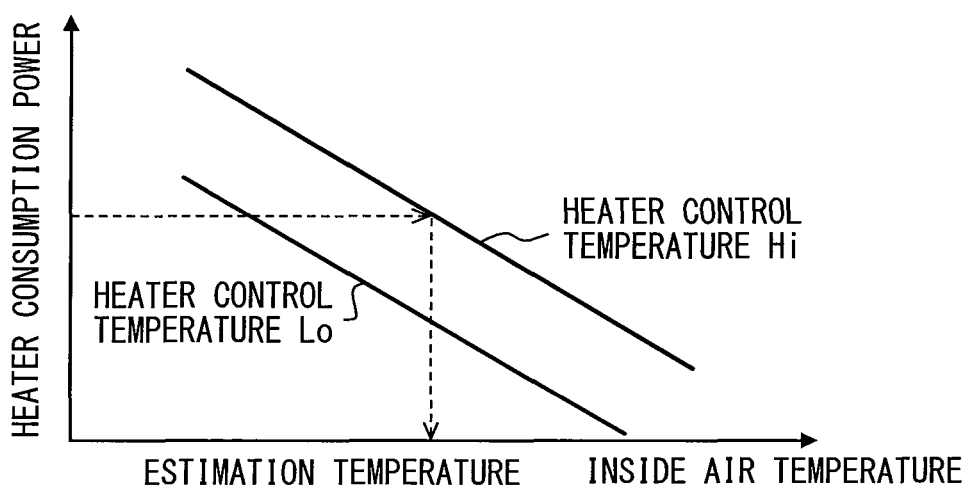
FIG. 42 is a control characteristic graph illustrating a relationship between an inside air temperature and a heater consumption power in the radiant heater device according to the fifteenth embodiment.

When it is determined that the conditions of the inside air temperature estimation are established in S240, the flowchart then proceeds to S250. In S250, a level of the heater temperature at the present time, and a power consumption of the heater at the present time are obtained. It is assumed that the level of the heater temperature is classified into two steps of a low temperature level and a high temperature level, for example, as control characteristic data illustrated in FIG. 42, and stored in advance. The predetermined control characteristic data illustrated in FIG. 42 is stored in a storage unit 33 in advance. Therefore, the storage unit 33 functions as a characteristic data storage unit for estimation of the inside air temperature. The control characteristic data of the low temperature level is data for defining a relational expression between the inside air temperature and the power consumption of the heater main body when the heater temperature is classified into the lower temperature as illustrated in FIG. 42. The control characteristic data of the high temperature level is data for defining a relational expression between the inside air temperature and the power consumption of the heater main body when the heater temperature is classified into the high temperature as illustrated in FIG. 42.

Further, in S260, the inside air temperature estimation unit 35 obtains the estimated inside air temperature on the basis of the power consumption of the heater main body obtained in S250 and the control characteristic data of FIG. 42. The estimated value of the inside air temperature obtained as described above is returned to S220, and used for determination of the heater output in S220. Since the output control unit 30 controls a voltage value and a current value to be supplied to the heating portion 11 depending on a heater output value determined in S220, in S230, the temperature and the amount of heat generation of the heating portion 11 are controlled depending on the estimated inside air temperature.

According to the fifteenth embodiment, the device 1 includes the inside air temperature estimation unit 35 that estimates the air temperature in the vehicle interior in which the heater main body is installed. The heat load is the amount of heat required for heating which is calculated on the basis of the estimated inside air temperature which is estimated by the inside air temperature estimation unit 35. Further, the device 1 includes the storage unit 33 (characteristic data storage unit) that stores the characteristic data defining a relationship between the power consumption of the heater main body, which is associated with the temperature of the heater main body, and the inside air temperature in advance. The inside air temperature estimation unit 35 obtains the estimated inside air temperature on the basis of the characteristic data and the power consumption of the heater main body at the present time.

According to the above control, because the inside air temperature used in calculation of the heat load is estimated, the device 1 that does not require the inside air temperature sensor provided in the air conditioning apparatus and the detected value of the newly installed inside air temperature sensor can be provided. Therefore, the system not associated with the air conditioning ECU and the simplified system can be provided. The device 1 that enables the output control even in the vehicle that does not detect the air temperature in the vehicle interior can be provided.

The device 1 includes the heater temperature detection unit for detecting the temperature of the heater main body. The inside air temperature estimation unit 35 employs the temperature of the heater main body detected by the heater temperature detection unit as the estimated inside air temperature used for calculation of the heat load in an initial energization stage of the heater main body. According to the above control, because the temperature of the heater is not too high in the initial energization stage of the heater main body, a simplified estimation logic of the inside air temperature can be provided with the use of the temperature of the heater as the estimated inside air temperature.

Sixteenth Embodiment

In a sixteenth embodiment, a description will be given of a heater output control according to another configuration of the fifteenth embodiment with reference to FIG. 43. In the sixteenth embodiment, components and processing denoted by the same symbols as those in the drawings according to the above-mentioned embodiments and configurations not particularly described are identical with those in the above-mentioned embodiments, and the same advantages are obtained. In the sixteenth embodiment, only portions different from the fifteenth embodiment will be described below.

Figure 43:
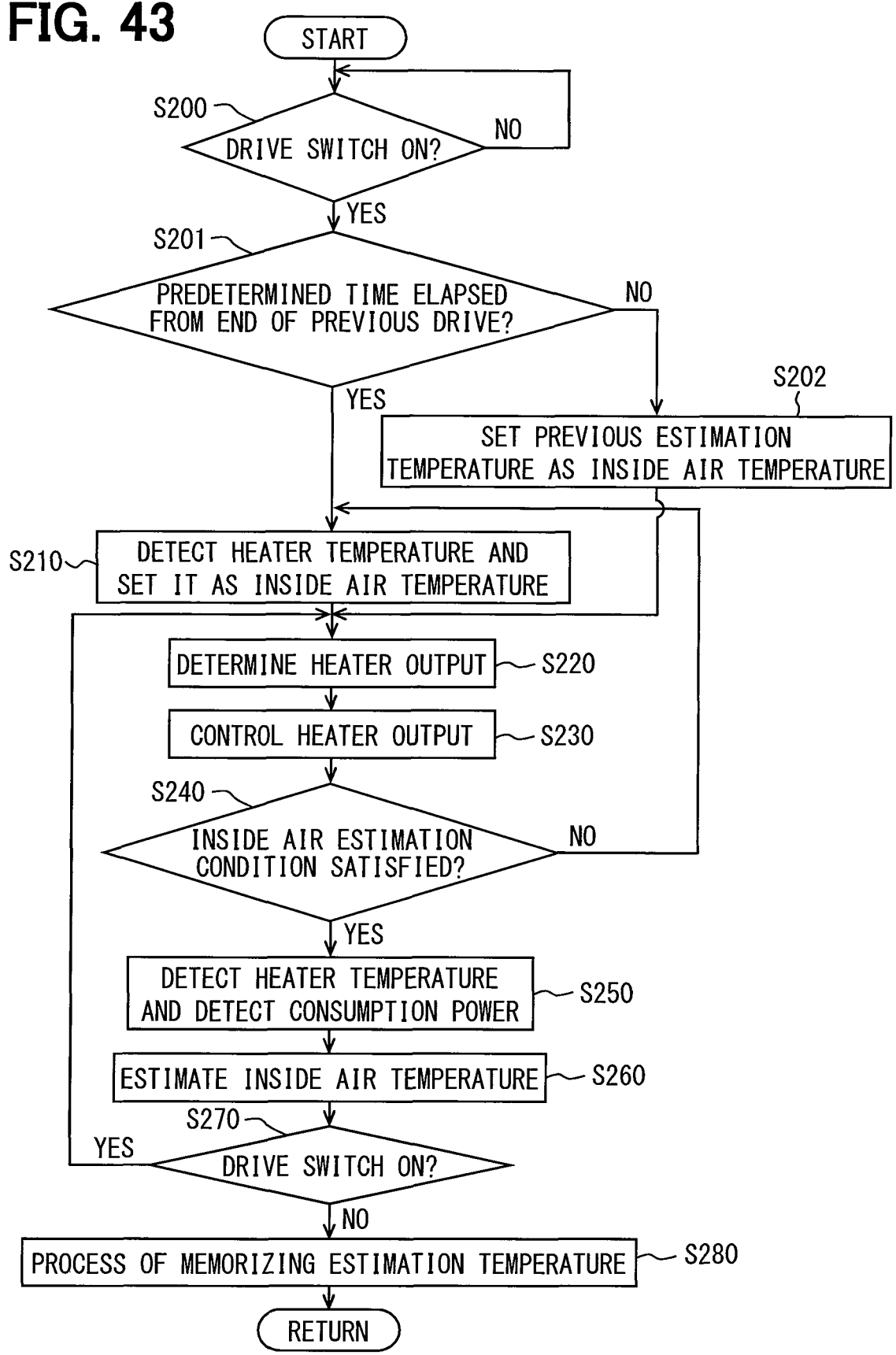
FIG. 43 is a flowchart illustrating operation control of a heating device according to the sixteenth embodiment.

A heater ECU 3 executes a heater output control according to a flowchart of FIG. 43. When the heater ECU 3 determines that an operation instruction has been input in S200, the heater ECU 3 determines whether a predetermined time elapses after the completion of previous operation, or not, in S201. The predetermined time is a time determined on the basis of experimental data by an actual device of a device 1, and the characteristics of a heater. The temperature of the heater is reduced more as the time elapses more from the energization completion. The predetermined time is a time determined on the basis of a reduction characteristic of the temperature of the heater, and is set to a time when the temperature of the heater can be estimated as the inside air temperature (air temperature in the vehicle interior). In other words, the predetermined time is set to a time when the above estimation can be determined not to affect a calculation result of the heat load.

When the heater ECU 3 determines that the predetermined time elapses after the completion of the previous operation in S201, the heater ECU 3 sets the heater temperature detected by a heater temperature sensor 61 as an inside air temperature used for calculation of the heat load in S210. The heater ECU 3 executes S220 and S230 described above on the basis of the inside air temperature set in S210. The reason why the detected heater temperature is set as the inside air temperature as in S210 is because it can be determined that a time sufficiently elapses after the completion of the previous operation, and the heater temperature is reduced to the same level as that of the inside air temperature.

In contrast, when the heater ECU 3 determines that the predetermined time does not elapse after the completion of the previous operation in S201, the heater ECU 3 sets the estimated inside air temperature estimated before the completion of the previous operation as the inside air temperature used for calculation of the heat load in S202. The heater ECU 3 executes S220 and S230 described above on the basis of the inside air temperature set in S202. The reason why the previous estimated inside air temperature is set as the inside air temperature as in S202 is because it can be determined that the temperature of the heater is higher than the inside air temperature, and is not sufficiently reduced.

The heater ECU 3 further executes S240, S250, and S260 described above, and then determines whether the operation instruction of the device 1 has been input by the operation of an on/off switch 50, or not, in S270. When the heater ECU 3 determines that the operation instruction has been input in S270, the heater ECU 3 again returns to S220, and executes the respective processes described above.

When the heater ECU 3 determines that the operation instruction has not been input in S270, because the operation of the device 1 is terminated, the heater ECU 3 executes a process of storing the estimated inside air temperature finally estimated in S260 in a storage unit 33 (S280). With the above process, the operation of the device 1 is terminated, and the heater ECU 3 returns to S200, and waits for operation start until the operation instruction of the device 1 is input by the operation of the on/off switch 50. The storage unit 33 functions as an estimated temperature storage unit for storing the estimated inside air temperature finally estimated before the previous energization of the heater main body is terminated.

According to the sixteenth embodiment, an inside air temperature estimation unit 35 employs the temperature of the heater main body detected by the heater temperature detection unit as the estimated inside air temperature used for calculation of the heat load when the predetermined time elapses after the completion of the previous energization of the heater main body.

According to the above control, when the time sufficiently elapses after the previous operation, because the temperature of the heater is low, a simplified estimation logic of the inside air temperature can be provided with the use of the detected temperature of the heater main body as the estimated inside air temperature.

The device 1 includes an estimated temperature storage unit (storage unit 33) for storing the estimated inside air temperature finally estimated before the previous energization of the heater main body is terminated. The inside air temperature estimation unit 35 employs the estimated inside air temperature finally estimated, which is stored in the estimated temperature storage unit, as the estimated inside air temperature used for calculation of the heat load when the energization of the heater main body starts before the predetermined time elapses after the completion of the previous energization of the heater main body.

According to the above control, the estimated inside air temperature estimated previously is stored, as a result of which the estimated inside air temperature stored at the time of subsequently starting up the operation can be effectively utilized since the energization of the heater main body is terminated until the heater main body is sufficiently cooled. As a result, because the accurate estimation of the inside air temperature can be implemented, the precise heat load can be obtained, and the appropriate heating feeling can be provided.

Other Embodiments

Hereinbefore, the preferred embodiments of the invention disclosed have been described. However, the disclosed invention is not limited to the embodiments described above and can be realized in various modifications. The structures of the above embodiments are merely exemplary, and technical scopes of the disclosed invention are not limited to the disclosed scopes. The technical scope of the disclosed invention is represented by the claims, and includes meanings equivalent to those of the claims, and all changes in the scope.

In the above embodiments, the heater ECU 3 is a control device configured to communicate with the air conditioning ECU, and separated from the air conditioning ECU. For example, the heater ECU 3 may be a shared control device integrated with the air conditioning ECU.

In the above embodiments, the set temperature level and the set output level of the heater are set to three steps of "high", "middle", and "low", but may be set to a larger number of steps, or may be configured to be settable to an output level that changes not step by step, but linearly.

In the second embodiment, the heater ECU 3 may receive information directly from the G sensor 700 as a unit for recognizing that the vehicle has collided or is likely to collide.

The transmission layer 14 and the LED 13 according to the eighth embodiment may be substituted by the front surface layer 101 and the heating portions 11 which are mixed with a material that emits a light by excitation due to heat. With the above configuration, when the heating portions 11 are energized, the front surface layer 101 and the heating portions 11 emit the light, and the occupant 21 can recognize that the system is in the operating state.

What is claimed is:
1. A radiant heater device comprising:
a heater main body having a heating portion that generates and outputs a heat output by being supplied with electric power to radiate radiation heat due to the heat supplied from the heating portion, the heater main body being installed in a vehicle cabin of a vehicle; and
a heater controller including a processor and memory configured to
determine whether an operation instruction for energizing the heating portion has been input by operation of a heater switch,
determine whether an operation instruction for an air conditioning apparatus that conditions air in the vehicle cabin has been input by operation of an air conditioning switch,
output an operation request to the air conditioning apparatus to operate a blower of the air conditioning apparatus in response to determining that the operation instruction for the air conditioning apparatus has not been input by operation of the air conditioning switch and in response to determining that the operation instruction for energizing the heating portion has been input,
acquire an inside air temperature in the vehicle cabin from an inside air temperature sensor of the air conditioning apparatus after the blower is operating,
calculate an amount of heat required for heating based on the inside air temperature,
determine a heat load around the heater main body based on the inside air temperature,
determine an upper limit of the heat output of the heating portion depending on the heat load around the heater main body, and
control the heat output of the heating portion depending on the heat load not to exceed the upper limit of the heat output in response to the operation instruction for energizing the heating portion being input.

2. The radiant heater device according to claim 1, wherein the heater controller is further configured to set
an output level of the heating portion,
the heater controller including a storage that stores control characteristic data used to determine the heat output of the heating portion relative to the heat load depending on the output level of the heating portion set by the heater controller in advance, wherein
the heater controller is further configured to control the heat output of the heating portion based on the heat load according to the control characteristic data and not to exceed the upper limit of the heat output determined by the heater controller when the output level set by the heater controller is a maximum level.

3. The radiant heater device according to claim 2, further comprising:
a switch configured to receive input from an occupant of the vehicle for setting the output level of the heating portion to the heater controller.

4. The radiant heater device according to claim 1, wherein the heater controller is further configured to set
an output level of the heating portion, and
wherein the radiant heater device further comprises a switch configured to receive input from an occupant of the vehicle for setting the output level of the heating portion to the heater controller, and
wherein the heater controller includes a storage that stores control characteristic data used to determine the heat output of the heating portion relative to the heat load depending on the output level of the heating portion set by the heater controller in advance.

5. The radiant heater device according to claim 1, wherein the heater controller is further configured to prohibit an energization of the heating portion when receiving a signal indicative of collision or likely collision of the vehicle, the signal being received from an airbag controller of the vehicle.

6. The radiant heater device according to claim 1, wherein the heater controller is configured to control an energization of the heating portion under a pulse width modulation control in which a ratio of a time to apply a voltage to the heating portion and a time not to apply the voltage to the heating portion is changed.

7. The radiant heater device according to claim 1, wherein the heater controller is configured to prohibit an energization of the heating portion in response to determining that a level of a battery mounted in the vehicle is low based on a detection value of a current sensor configured to detect a current level of the electric power supplied to the heating portion.

8. The radiant heater device according to claim 1, wherein the heater controller is configured to stop an energization of the heating portion when determining that a temperature of the heater main body exceeds a predetermined upper limit temperature, the temperature of the heater main body being detected by a heater temperature sensor configured to output the temperature of the heater main body to the heater controller.

9. The radiant heater device according to claim 1, wherein in response to a preset timer time having elapsed after an energization of the heater main body is started, the heater controller is configured to suppress or stop an energization of the heating portion.

10. The radiant heater device according to claim 1, wherein
the heater controller is further configured to output an operation demand to the air conditioning apparatus for operating the blower in response to a mode of blowing air into the vehicle interior by the air conditioning apparatus being set to a foot blowing mode.

11. The radiant heater device according to claim 1, wherein
the heater controller is further configured to output an operation demand to the air conditioning apparatus for operating the blower at an air volume level lower than an air volume level when an automatic air conditioning operation is set.

12. The radiant heater device according to claim 1, wherein
the heater controller is further configured to output an operation demand to the air conditioning apparatus to intermittently operate the blower by successively repeating a blowing operation and a stop in the blowing operation.

13. The radiant heater device according to claim 1, wherein
the operation request outputted to the air conditioning apparatus requests the air conditioning apparatus to prohibit a defroster blowing mode, the defroster blowing mode including blowing air with the air conditioning apparatus onto a windshield of the vehicle.

14. The radiant heater device according to claim 1, wherein
the heater controller is configured to acquire the inside air temperature from the inside air temperature sensor through an air conditioning controller that controls the air conditioning apparatus.

\* \* \* \* \*